(12) United States Patent
el Kaliouby et al.

(10) Patent No.: US 11,700,420 B2
(45) Date of Patent: Jul. 11, 2023

(54) MEDIA MANIPULATION USING COGNITIVE STATE METRIC ANALYSIS

(71) Applicant: Affectiva, Inc., Boston, MA (US)

(72) Inventors: Rana el Kaliouby, Milton, MA (US); Melissa Sue Burke, Boston, MA (US); Andrew Edwin Dreisch, San Jose, CA (US); Graham John Page, Banbury (GB); Panu James Turcot, Pacifica, CA (US); Evan Kodra, Waltham, MA (US)

(73) Assignee: Affectiva, Inc., Boston, MA (US)

( * ) Notice: Subject to any disclaimer, the term of this patent is extended or adjusted under 35 U.S.C. 154(b) by 0 days.

(21) Appl. No.: 16/900,026

(22) Filed: Jun. 12, 2020

(65) Prior Publication Data

US 2020/0314490 A1 Oct. 1, 2020

Related U.S. Application Data

(63) Continuation-in-part of application No. 16/017,037, filed on Jun. 25, 2018, now Pat. No. 10,869,626, (Continued)

(51) Int. Cl.
*H04N 21/442* (2011.01)
*H04N 21/258* (2011.01)
(Continued)

(52) U.S. Cl.
CPC ..... *H04N 21/44218* (2013.01); *G06V 40/174* (2022.01); *H04N 21/252* (2013.01); *H04N 21/25891* (2013.01); *H04N 21/26241* (2013.01)

(58) Field of Classification Search
CPC ....... H04N 21/44218; H04N 21/25891; H04N 21/26241; H04N 21/252; H04N 21/251;
(Continued)

(56) References Cited

U.S. PATENT DOCUMENTS 3,034,500 A 5/1962 Backster, Jr.
3,548,806 A 12/1970 Fisher
(Continued)

FOREIGN PATENT DOCUMENTS

JP 08115367 7/1996
KR 10-2005-0021759 A 3/2005
(Continued)

OTHER PUBLICATIONS

Rana Ayman El Kaliouby, Mind-reading machines: automated inference of complex mental states, Jul. 2005, University of Cambridge, Cambridge, United Kingdom.
(Continued)

*Primary Examiner* — Wesley J Tucker
(74) *Attorney, Agent, or Firm* — Adams Intellex, PLC

(57) ABSTRACT

Data on a user interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content. An engagement score for the media presentation is provided. The engagement score is based on the emotional intensity metric. A facial expression metric and a cognitive state metric are generated for the user. The manipulating includes optimization of the previously viewed media presentation. The optimization changes various aspects of the media presentation, including the length of different portions of the media presentation, the overall length of the media presentation, character selection, music selection, advertisement placement, and brand reveal time.

28 Claims, 14 Drawing Sheets

Related U.S. Application Data which is a continuation-in-part of application No. 14/328,554, filed on Jul. 10, 2014, now Pat. No. 10,111,611, which is a continuation-in-part of application No. 13/153,745, filed on Jun. 6, 2011, now abandoned, application No. 16/900,026 is a continuation-in-part of application No. 15/012,246, filed on Feb. 1, 2016, now Pat. No. 10,843,078, and a continuation-in-part of application No. 14/961,279, filed on Dec. 7, 2015, now Pat. No. 10,143,414, which is a continuation-in-part of application No. 14/796,419, filed on Jul. 10, 2015, now abandoned, which is a continuation-in-part of application No. 14/460,915, filed on Aug. 15, 2014, now abandoned, which is a continuation-in-part of application No. 13/153,745, filed on Jun. 6, 2011, now abandoned, said application No. 14/961,279 is a continuation-in-part of application No. 14/064,136, filed on Oct. 26, 2013, now Pat. No. 9,204,836, which is a continuation-in-part of application No. 13/153,745, filed on Jun. 6, 2011, now abandoned, said application No. 15/012,246 is a continuation-in-part of application No. 14/214,751, filed on Mar. 15, 2014, now abandoned, which is a continuation-in-part of application No. 13/153,745, filed on Jun. 6, 2011, now abandoned, said application No. 15/012,246 is a continuation-in-part of application No. 13/886,249, filed on May 2, 2013, now abandoned, which is a continuation-in-part of application No. 13/153,745, filed on Jun. 6, 2011, now abandoned, said application No. 15/012,246 is a continuation-in-part of application No. 13/867,049, filed on Apr. 20, 2013, now abandoned, which is a continuation-in-part of application No. 13/708,214, filed on Dec. 7, 2012, now abandoned, said application No. 13/867,049 is a continuation-in-part of application No. 13/153,745, filed on Jun. 6, 2011, now abandoned, and application No. 15/012,246, Feb. 1, 2016, which is a continuation-in-part of application No. 13/768,288, filed on Feb. 15, 2013, now abandoned, said application No. 15/012,246 is a continuation of application No. 13/366,648, filed on Feb. 6, 2012, now Pat. No. 9,247,903, which is a continuation-in-part of application No. 13/297,342, filed on Nov. 16, 2011, now abandoned, said application No. 13/366,648 is a continuation-in-part of application No. 13/153,745, filed on Jun. 6, 2011, now abandoned, application No. 16/900,026 is a continuation-in-part of application No. 14/068,919, filed on Oct. 31, 2013, now abandoned, which is a continuation-in-part of application No. 13/708,214, filed on Dec. 7, 2012, now abandoned, said application No. 14/068,919 is a continuation-in-part of application No. 13/153,745, filed on Jun. 6, 2011, now abandoned.

(60) Provisional application No. 62/955,493, filed on Dec. 31, 2019, provisional application No. 62/954,819, filed on Dec. 30, 2019, provisional application No. 62/954,833, filed on Dec. 30, 2019, provisional application No. 62/925,990, filed on Oct. 25, 2019, provisional application No. 62/926,009, filed on Oct. 25, 2019, provisional application No. 62/893,298, filed on Aug. 29, 2019, provisional application No. 62/679,825, filed on Jun. 3, 2018, provisional application No. 62/637,567, filed on Mar. 2, 2018, provisional application No. 62/625,274, filed on Feb. 1, 2018, provisional application No. 62/611,780, filed on Dec. 29, 2017, provisional application No. 62/593,440, filed on Dec. 1, 2017, provisional application No. 62/593,449, filed on Dec. 1, 2017, provisional application No. 62/557,460, filed on Sep. 12, 2017, provisional application No. 62/541,847, filed on Aug. 7, 2017, provisional application No. 62/524,606, filed on Jun. 25, 2017, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/844,478, filed on Jul. 10, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010, provisional application No. 62/273,896, filed on Dec. 31, 2015, provisional application No. 62/265,937, filed on Dec. 10, 2015, provisional application No. 62/217,872, filed on Sep. 12, 2015, provisional application No. 62/222,518, filed on Sep. 23, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 61/867,007, filed on Aug. 16, 2013, provisional application No. 61/953,878, filed on Mar. 16, 2014, provisional application No. 61/972,314, filed on Mar. 30, 2014, provisional application No. 62/023,800, filed on Jul. 11, 2014, provisional application No. 61/719,383, filed on Oct. 27, 2012, provisional application No. 61/747,651, filed on Dec. 31, 2012, provisional application No. 61/747,810, filed on Dec. 31, 2012, provisional application No. 61/793,761, filed on Mar. 15, 2013, provisional application No. 61/790,461, filed on Mar. 15, 2013, provisional application No. 61/798,731, filed on Mar. 15, 2013, provisional application No. 61/641,852, filed on May 2, 2012, provisional application No. 61/568,130, filed on Dec. 7, 2011, provisional application No. 61/581,913, filed on Dec. 30, 2011, provisional application No. 61/636,634, filed on Apr. 21, 2012, provisional application No. 61/618,750, filed on Mar. 31, 2012, provisional application No. 61/580,880, filed on Dec. 28, 2011, provisional application No. 61/467,209, filed on Mar. 24, 2011, provisional application No. 61/549,560, filed on Oct. 20, 2011.

(51) Int. Cl.
*H04N 21/262* (2011.01)
*H04N 21/25* (2011.01)
*G06V 40/16* (2022.01)

(58) Field of Classification Search
CPC ......... H04N 21/23418; H04N 21/2668; H04N 21/25866; H04N 21/4532; H04N 21/44008; H04N 21/458; H04N 21/4666; H04N 21/812; H04N 21/4223; G06K 9/00302; G06K 9/00335; G06Q 30/0241
See application file for complete search history.

(56) References Cited

U.S. PATENT DOCUMENTS

| | | | |
|---|---|---|---|
| 3,870,034 A | 3/1975 | James | |
| 4,353,375 A | 10/1982 | Colburn et al. | |
| 4,448,203 A | 5/1984 | Williamson et al. | |
| 4,794,533 A | 12/1988 | Cohen | |
| 4,807,642 A | 2/1989 | Brown | |
| 4,817,628 A | 4/1989 | Zealear et al. | |
| 4,950,069 A | 8/1990 | Hutchinson | |
| 4,964,411 A | 10/1990 | Johnson et al. | |
| 5,016,282 A | 5/1991 | Tomono et al. | |
| 5,031,228 A | 7/1991 | Lu | |
| 5,219,322 A | 6/1993 | Weathers | |
| 5,247,938 A | 9/1993 | Silverstein et al. | |
| 5,259,390 A | 11/1993 | Maclean | |
| 5,507,291 A | 4/1996 | Stirbl et al. | |
| 5,572,596 A | 11/1996 | Wildes et al. | |
| 5,619,571 A | 4/1997 | Sandstorm et al. | |
| 5,647,834 A | 7/1997 | Ron | |
| 5,649,061 A | 7/1997 | Smyth | |
| 5,663,900 A | 9/1997 | Bhandari et al. | |
| 5,666,215 A | 9/1997 | Fredlund et al. | |
| 5,725,472 A | 3/1998 | Weathers | |
| 5,741,217 A | 4/1998 | Gero | |
| 5,760,917 A | 6/1998 | Sheridan | |
| 5,762,611 A | 6/1998 | Lewis et al. | |
| 5,772,508 A | 6/1998 | Sugita et al. | |
| 5,772,591 A | 6/1998 | Cram | |
| 5,774,591 A | 6/1998 | Black et al. | |
| 5,802,220 A | 9/1998 | Black et al. | |
| 5,825,355 A | 10/1998 | Palmer et al. | |
| 5,886,683 A | 3/1999 | Tognazzini et al. | |
| 5,898,423 A | 4/1999 | Tognazzini et al. | |
| 5,920,477 A | 7/1999 | Hoffberg et al. | |
| 5,945,988 A | 8/1999 | Williams et al. | |
| 5,959,621 A | 9/1999 | Nawaz et al. | |
| 5,969,755 A | 10/1999 | Courtney | |
| 5,983,129 A | 11/1999 | Cowan et al. | |
| 5,987,415 A | 11/1999 | Breese et al. | |
| 6,004,061 A | 12/1999 | Manico et al. | |
| 6,004,312 A | 12/1999 | Finneran et al. | |
| 6,008,817 A | 12/1999 | Gilmore., Jr. | |
| 6,026,321 A | 2/2000 | Miyata et al. | |
| 6,026,322 A | 2/2000 | Korenman et al. | |
| 6,056,781 A | 5/2000 | Wassick et al. | |
| 6,067,565 A | 5/2000 | Horvitz | |
| 6,088,040 A | 7/2000 | Oda et al. | |
| 6,091,334 A | 7/2000 | Galiana et al. | |
| 6,099,319 A | 8/2000 | Zaltman et al. | |
| 6,134,644 A | 10/2000 | Mayuzumi et al. | |
| 6,182,098 B1 | 1/2001 | Selker | |
| 6,185,534 B1 | 2/2001 | Breese et al. | |
| 6,195,651 B1 | 2/2001 | Handel et al. | |
| 6,212,502 B1 | 4/2001 | Ballet et al. | |
| 6,222,607 B1 | 4/2001 | Szajewski et al. | |
| 6,309,342 B1 | 10/2001 | Blazey et al. | |
| 6,327,580 B1 | 12/2001 | Pierce et al. | |
| 6,349,290 B1 | 2/2002 | Horowitz et al. | |
| 6,351,273 B1 | 2/2002 | Lemelson et al. | |
| 6,437,758 B1 | 8/2002 | Nielsen et al. | |
| 6,443,840 B2 | 9/2002 | Von Kohorn | |
| 6,530,082 B1 | 3/2003 | Del Sesto et al. | |
| 6,577,329 B1 | 6/2003 | Flickner et al. | |
| 6,606,102 B1 | 8/2003 | Odom | |
| 6,629,104 B1 | 9/2003 | Parulski et al. | |
| 6,792,458 B1 | 9/2004 | Muret et al. | |
| 6,847,376 B2 | 1/2005 | Engeldrum et al. | |
| 7,003,135 B2 | 2/2006 | Hsieh et al. | |
| 7,013,478 B1 | 3/2006 | Hendricks et al. | |
| 7,113,916 B1 | 9/2006 | Hill | |
| 7,120,880 B1 | 10/2006 | Dryer et al. | |
| 7,197,459 B1 | 3/2007 | Harinarayan et al. | |
| 7,233,684 B2 | 6/2007 | Fedorovskaya et al. | |
| 7,246,081 B2 | 7/2007 | Hill | |
| 7,263,474 B2 | 8/2007 | Fables et al. | |
| 7,266,582 B2 | 9/2007 | Stelting | |
| 7,307,636 B2 | 12/2007 | Matraszek et al. | |
| 7,319,779 B1 | 1/2008 | Mummareddy et al. | |
| 7,327,505 B2 | 2/2008 | Fedorovskaya et al. | |
| 7,350,138 B1 | 3/2008 | Swaminathan et al. | |
| 7,353,399 B2 | 4/2008 | Ooi et al. | |
| 7,355,627 B2 | 4/2008 | Yamazaki et al. | |
| 7,428,318 B1 | 9/2008 | Madsen et al. | |
| 7,474,801 B2 | 1/2009 | Teo et al. | |
| 7,496,622 B2 | 2/2009 | Brown et al. | |
| 7,549,161 B2 | 6/2009 | Poo et al. | |
| 7,551,755 B1 | 6/2009 | Steinberg et al. | |
| 7,555,148 B1 | 6/2009 | Steinberg et al. | |
| 7,558,408 B1 | 7/2009 | Steinberg et al. | |
| 7,564,994 B1 | 7/2009 | Steinberg et al. | |
| 7,573,439 B2 | 8/2009 | Lau et al. | |
| 7,580,512 B2 | 8/2009 | Batni et al. | |
| 7,584,435 B2 | 9/2009 | Bailey et al. | |
| 7,587,068 B1 | 9/2009 | Steinberg et al. | |
| 7,610,289 B2 | 10/2009 | Muret et al. | |
| 7,620,934 B2 | 11/2009 | Falter et al. | |
| 7,644,375 B1 | 1/2010 | Anderson et al. | |
| 7,676,574 B2 | 3/2010 | Glommen et al. | |
| 7,757,171 B1 | 7/2010 | Wong et al. | |
| 7,826,657 B2 | 11/2010 | Zhang et al. | |
| 7,830,570 B2 | 11/2010 | Morita et al. | |
| 7,881,493 B1 * | 2/2011 | Edwards | G06K 9/00597 |
| | | | 382/103 |
| 7,921,036 B1 * | 4/2011 | Sharma | G06Q 30/02 |
| | | | 705/14.66 |
| 8,010,458 B2 | 8/2011 | Galbreath et al. | |
| 8,022,831 B1 | 9/2011 | Wood-Eyre | |
| 8,219,438 B1 | 7/2012 | Moon et al. | |
| 8,401,248 B1 | 3/2013 | Moon et al. | |
| 8,442,638 B2 | 5/2013 | Libbus et al. | |
| 8,522,779 B2 | 9/2013 | Lee et al. | |
| 8,600,120 B2 | 12/2013 | Gonion et al. | |
| 8,640,021 B2 | 1/2014 | Perez et al. | |
| 9,355,366 B1 * | 5/2016 | Young | G06V 10/82 |
| 11,146,856 B2 * | 10/2021 | Salo | H04N 21/44218 |
| 2001/0033286 A1 | 10/2001 | Stokes et al. | |
| 2001/0041021 A1 | 11/2001 | Boyle et al. | |
| 2002/0007249 A1 | 1/2002 | Cranley | |
| 2002/0030665 A1 | 3/2002 | Ano | |
| 2002/0042557 A1 | 4/2002 | Bensen et al. | |
| 2002/0054174 A1 | 5/2002 | Abbott et al. | |
| 2002/0084902 A1 | 7/2002 | Zadrozny et al. | |
| 2002/0171551 A1 | 11/2002 | Eshelman | |
| 2002/0182574 A1 | 12/2002 | Freer | |
| 2003/0035567 A1 | 2/2003 | Chang et al. | |
| 2003/0037041 A1 | 2/2003 | Hertz | |
| 2003/0060728 A1 | 3/2003 | Mandigo | |
| 2003/0093784 A1 | 5/2003 | Dimitrova et al. | |
| 2003/0182123 A1 | 9/2003 | Mitsuyoshi | |
| 2003/0191682 A1 | 10/2003 | Shepard et al. | |
| 2003/0191816 A1 * | 10/2003 | Landress | G06Q 30/02 |
| | | | 709/219 |
| 2004/0181457 A1 | 9/2004 | Biebesheimer | |
| 2005/0187437 A1 | 8/2005 | Matsugu | |
| 2005/0283055 A1 | 12/2005 | Shirai et al. | |
| 2005/0289582 A1 | 12/2005 | Tavares et al. | |
| 2006/0019224 A1 | 1/2006 | Behar et al. | |
| 2006/0143647 A1 | 6/2006 | Bill | |
| 2006/0170945 A1 | 8/2006 | Bill | |
| 2006/0235753 A1 | 10/2006 | Kameyama | |
| 2007/0167689 A1 | 7/2007 | Ramadas et al. | |
| 2007/0173733 A1 | 7/2007 | Le et al. | |
| 2007/0239787 A1 | 10/2007 | Cunningham et al. | |
| 2007/0255831 A1 | 11/2007 | Hayashi et al. | |
| 2007/0265507 A1 | 11/2007 | de Lemos | |
| 2007/0299964 A1 | 12/2007 | Wong et al. | |
| 2008/0059570 A1 | 3/2008 | Bill | |
| 2008/0091512 A1 * | 4/2008 | Marci | G06Q 30/0201 |
| | | | 705/7.29 |
| 2008/0091515 A1 | 4/2008 | Thieberger et al. | |
| 2008/0101660 A1 | 5/2008 | Seo | |
| 2008/0103784 A1 | 5/2008 | Wong et al. | |
| 2008/0167757 A1 | 7/2008 | Kanevsky et al. | |
| 2008/0184170 A1 | 7/2008 | Periyalwar | |
| 2008/0201144 A1 | 8/2008 | Song et al. | |
| 2008/0208015 A1 | 8/2008 | Morris et al. | |

(56) References Cited

U.S. PATENT DOCUMENTS

| | | |
|---|---|---|
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1* | 8/2009 | Elliott ............... G06Q 30/0207 705/7.31 |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1* | 11/2009 | Moon ............... G06K 9/00335 382/118 |
| 2009/0299840 A1 | 12/2009 | Smith |
| 2010/0058381 A1* | 3/2010 | Begeja ............... H04N 7/165 725/34 |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0271484 A1 | 10/2012 | Feit et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2013/0288212 A1* | 10/2013 | Bist ............... G06Q 50/01 434/236 |
| 2014/0172910 A1 | 6/2014 | Jung et al. |
| 2014/0282651 A1* | 9/2014 | Baratz ............... H04N 21/222 725/13 |
| 2015/0019340 A1* | 1/2015 | El-Masri ............ G06Q 30/0252 705/14.62 |
| 2016/0104486 A1 | 4/2016 | Penilla et al. |
| 2017/0003784 A1 | 1/2017 | Garg et al. |
| 2017/0251262 A1* | 8/2017 | Bist ............... H04N 21/6582 |
| 2017/0297587 A1 | 10/2017 | Mimura et al. |
| 2018/0050696 A1 | 2/2018 | Misu et al. |
| 2018/0251122 A1 | 9/2018 | Golston et al. |
| 2019/0049965 A1 | 2/2019 | Tanriover |
| 2019/0135325 A1 | 5/2019 | Lisseman et al. |
| 2020/0103980 A1 | 4/2020 | Katz et al. |
| 2020/0171977 A1 | 6/2020 | Jales Costa et al. |
| 2020/0223362 A1 | 7/2020 | Witte |
| 2020/0285871 A1 | 9/2020 | Tokizaki et al. |
| 2020/0288206 A1* | 9/2020 | Bist ............... H04N 21/4756 |
| 2020/0130528 A1 | 10/2020 | Upmanue et al. |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, EEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

Fasel, B. (Aug. 2002 ). Robust face analysis using convolutional neural networks. In Object recognition supported by user interaction for service robots (vol. 2, pp. 40-43). IEEE.

Matsugu, M., Mori, K., Mitari, Y., & Kaneda, Y. (2003). Subject independent facial expression recognition with robust face detection using a convolutional neural network. Neural Networks, 16(5-6), 555-559.

\* cited by examiner

MEDIA MANIPULATION USING COGNITIVE STATE METRIC ANALYSIS

RELATED APPLICATIONS

This application claims the benefit of U.S. provisional patent applications "Vehicle Interior Object Management" Ser. No. 62/893,298, filed Aug. 29, 2019, "Deep Learning In Situ Retraining" Ser. No. 62/925,990, filed Oct. 25, 2019, "Data Versioning for Neural Network Training" Ser. No. 62/926,009, filed Oct. 25, 2019, "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, and "Autonomous Vehicle Control Using Longitudinal Profile Generation" Ser. No. 62/955,493, filed Dec. 31, 2019.

This application is also a continuation-in-part of U.S. patent application "Image Analysis for Emotional Metric Generation" Ser. No. 16/017,037, filed Jun. 25, 2018, which claims the benefit of U.S. provisional patent applications "Image Analysis for Emotional Metric Generation" Ser. No. 62/524,606, filed Jun. 25, 2017, "Image Analysis and Representation for Emotional Metric Threshold Evaluation" Ser. No. 62/541,847, filed Aug. 7, 2017, "Multimodal Machine Learning for Emotion Metrics" Ser. No. 62/557,460, filed Sep. 12, 2017, "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, "Directed Control Transfer for Autonomous Vehicles" Ser. No. 62/611,780, filed Dec. 29, 2017, "Cognitive State Vehicle Navigation Based on Image Processing" Ser. No. 62/625,274, filed Feb. 1, 2018, "Cognitive State Based Vehicle Manipulation Using Near Infrared Image Processing" Ser. No. 62/637,567, filed Mar. 2, 2018, and "Vehicle Manipulation Using Cognitive State" Ser. No. 62/679,825, filed Jun. 3, 2018.

The U.S. patent application "Image Analysis for Emotional Metric Generation" Ser. No. 16/017,037, filed Jun. 25, 2018 is also a continuation-in-part of U.S. patent application "Personal Emotional Profile Generation" Ser. No. 14/328,554, filed Jul. 11, 2014, which claims the benefit of U.S. provisional patent applications "Personal Emotional Profile Generation" Ser. No. 61/844,478, filed Jul. 10, 2013, "Heart Rate Variability Evaluation for Mental State Analysis" Ser. No. 61/916,190, filed Dec. 14, 2013, "Mental State Analysis Using an Application Programming Interface" Ser. No. 61/924,252, filed Jan. 7, 2014, and "Mental State Analysis for Norm Generation" Ser. No. 61/927,481, filed Jan. 15, 2014.

The U.S. patent application "Personal Emotional Profile Generation" Ser. No. 14/328,554, filed Jul. 11, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

This application is also a continuation-in-part of U.S. patent application "Optimizing Media Based on Mental State Analysis" Ser. No. 14/068,919, filed Oct. 31, 2013, which claims the benefit of U.S. provisional patent applications "Optimizing Media Based on Mental State Analysis" Ser. No. 61/747,651, filed Dec. 31, 2012, "Collection of Affect Data from Multiple Mobile Devices" Ser. No. 61/747,810, filed Dec. 31, 2012, "Mental State Analysis Using Heart Rate Collection Based on Video Imagery" Ser. No. 61/793,761, filed Mar. 15, 2013, "Mental State Data Tagging for Data Collected from Multiple Sources" Ser. No. 61/790,461, filed Mar. 15, 2013, "Mental State Analysis Using Blink Rate" Ser. No. 61/789,038, filed Mar. 15, 2013, "Mental State Well Being Monitoring" Ser. No. 61/798,731, filed Mar. 15, 2013, and "Personal Emotional Profile Generation" Ser. No. 61/844,478, filed Jul. 10, 2013.

The U.S. patent application "Optimizing Media Based on Mental State Analysis" Ser. No. 14/068,919, filed Oct. 31, 2013 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The U.S. patent application "Optimizing Media Based on Mental State Analysis" Ser. No. 14/068,919, filed Oct. 31, 2013 is also a continuation-in-part of US patent application "Affect Based Evaluation of Advertisement Effectiveness" Ser. No. 13/708,214, filed Dec. 7, 2012, which claims the benefit of U.S. provisional patent applications "Mental State Evaluation Learning for Advertising" Ser. No. 61/568,130, filed Dec. 7, 2011 and "Affect Based Evaluation of Advertisement Effectiveness" Ser. No. 61/581,913, filed Dec. 30, 2011.

Each of the foregoing applications is hereby incorporated by reference in its entirety.

FIELD OF ART

This application relates generally to media manipulation and more particularly to media manipulation using cognitive state metric analysis.

BACKGROUND

Communication is the process of sharing and understanding messages. It's often described as "the transfer of information" because it involves a sender and receiver. The sender encodes a message using verbal or written words, tones, postures, eye contact, facial expressions, pictures, symbols, graphs, gestures, and other nonverbal signals. The message is sent either intentionally or unintentionally. The receiver decodes and interprets the message. The receiver may then become a sender and share feedback or another message in response. The response can also be intentional or unintentional, and it can indicate how well and how accurately the message was received. The level of understanding between the sender and receiver depends upon the effectiveness of encoding, decoding, and interpreting the message.

There are many barriers to effective communication. Language differences, unfamiliar accents, speech difficulties, and hearing problems can pose challenges. Likewise, cultural differences and the use of jargon can lead to misunderstanding. Everyday challenges like distractions and perception or viewpoint differences can also cause a misinterpretation of the message. In one sense, communication is simple. Even babies communicate with their first cries. However, the more complex the message, the more complicated the communication becomes. Accurately encoding, decoding, and interpreting both verbal and nonverbal messages is important. Effective communication builds connection among family and friends. It aids instruction between teachers and students, as well as between coaches and players. It helps politicians understand and represent their constituents. It enables collaboration, partnerships, and transactions critical to research and business. Team leaders communicate vision, goals, and strategies to encourage teamwork. Employees and colleagues communicate to solve problems. Companies also use communication to market and advertise their products and services to customers, and to collect feedback from them. Communication with customers is critical to companies' success. In addition to in-person conversations, businesses have used phone calls, newsletters, and mail correspondence as a means of communicating with customers. Today, companies also use online exchanges through email, messaging, social media, and other media.

Collecting feedback from customers is a critical piece of communication which enables companies not only to improve their products and services, but also to hone their message and presentation of those products and services through advertisements. Tools like surveys and focus groups collect written and verbal messages in response to prompts and presentations, but they don't consider nonverbal forms of communication. Nonverbal communication, such as facial expressions and posture and gestures, help decode and interpret customer feedback. Sometimes nonverbal communication alone sends a message. When a customer reacts to an advertisement, the customer's real-time facial expressions communicate unfiltered, honest response messages. The customer's reactions or intensity of the reactions can change over the course of the advertisement. Accurately decoding and interpreting messages such as customer interest or boredom, excitement or disgust, and satisfaction or frustration, can drive advertising decisions. This feedback enables marketers to more effectively communicate how company products and services meet customer needs and desires.

SUMMARY

Data on a user interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content. An engagement score for the media presentation is provided. The engagement score is based on the emotional intensity metric. A facial expression metric and a cognitive state metric are generated for the user. The manipulating includes optimization of the previously viewed media presentation. The optimization changes various aspects of the media presentation, including the length of different portions of the media presentation, the overall length of the media presentation, character selection, music selection, advertisement placement, and brand reveal time.

A computer-implemented method for media manipulation is disclosed comprising: collecting, at a client device, data on a user interacting with a media presentation, wherein the data comprises facial image data of the user; analyzing, using one or more processors, the facial image data to extract cognitive state content of the user; generating one or more emotional intensity metrics based on the cognitive state content; and manipulating the media presentation based on the emotional intensity metrics and the cognitive state content. Some embodiments provide an engagement score for the media presentation, based on the emotional intensity metric. Other embodiments comprise calculating a facial expression metric for the user based on the facial image data. In some embodiments, the cognitive state content includes a cognitive state metric for the user, generated from the facial expression metric. Often, the collecting of the cognitive state data from the plurality of people is performed over multiple viewings of the media presentation. In embodiments, advertisement placement is determined within the media presentation as part of the optimizing. In some embodiments, an optimal number of viewings is determined for the media presentation as part of the optimizing. In embodiments, norms are developed based on a plurality of media presentations where the norms are used in the optimizing of the media presentation. In some embodiments, music is added to the media presentation as part of the manipulating. And in some embodiments, the collecting is performed within a vehicle and the analyzing, the generating, and the manipulating comprise a mobile media laboratory.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
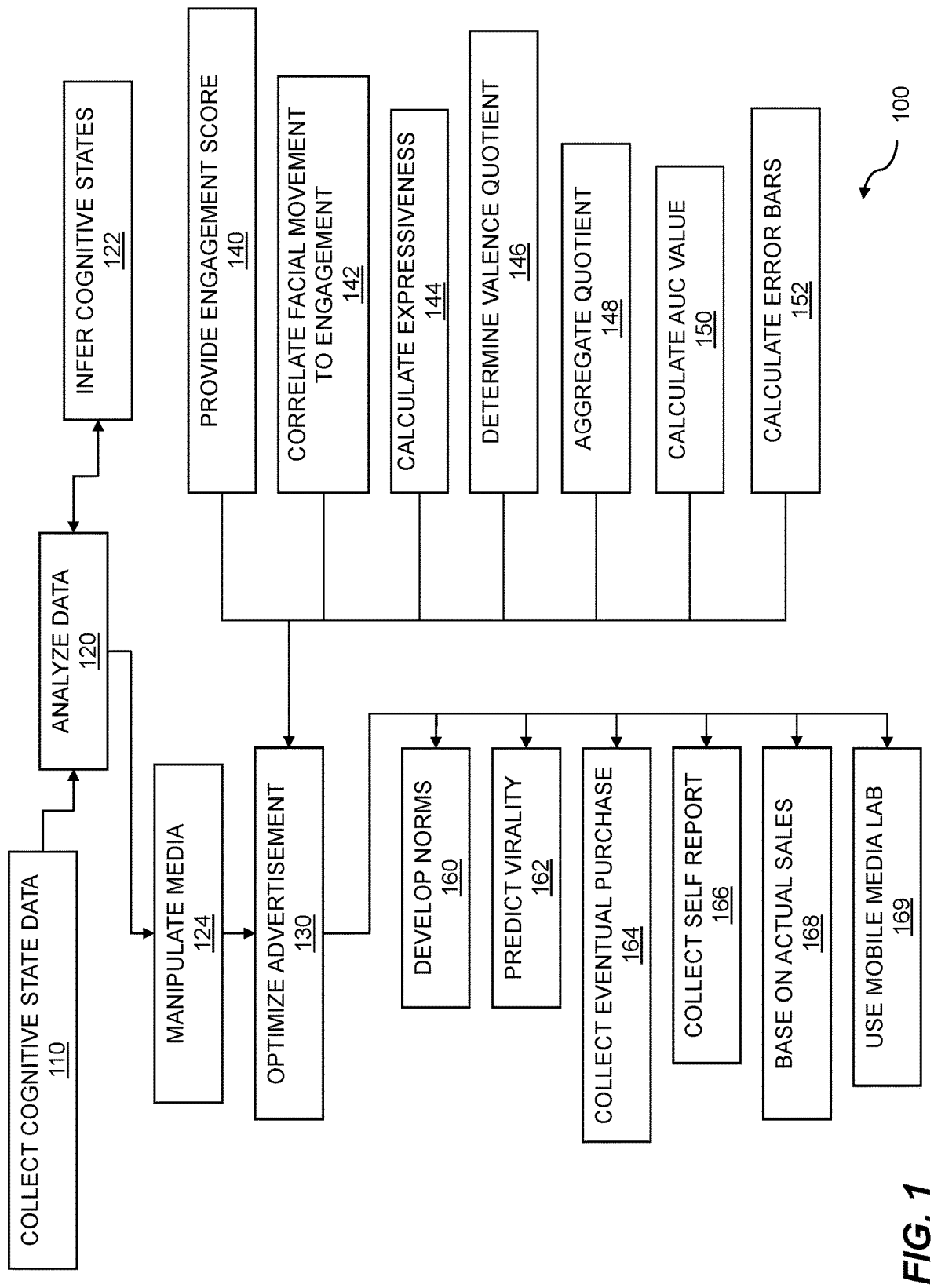
FIG. 1 is a flow diagram for advertisement optimization.

The manipulation, generation, editing, and improvement of media presentations such as advertisements, movies, and television programs have traditionally involved using experienced media practitioners to analyze and optimize media products before release. The result has been erratic, as even with the guidance of highly experienced media practitioners, numerous television shows are quickly cancelled after initial release and a great number of advertisements vastly underperform expectations. A quantifiable measurement of affect could have a profound impact on the optimization of media content. Television shows and movies aim to interest and entertain millions, and advertisements are intended to move large numbers of people to purchase a product or change their attitude. Before an advertisement, TV show, or movie is launched, content providers often test content by soliciting feedback from a consumer panel. The results of this testing may be used to optimize the content or, in the case of a television show, assess audience engagement with certain characters in the show. In one traditional measurement method, panelists are asked to turn a hardware dial to quantify valence throughout the show. In such studies, dial values, which may be collected at discrete time intervals such as once per second, may range from 0 to 100. In this case, the panelists may be told that a value of 0 signifies disinterest, a value of 50 represents neutral feelings, and a value of 100 demonstrates interest in the show.

While the dial approach has been used for many years, it has several drawbacks. First, its use requires the recruitment and physical coordination of panelists, typically in a limited geographic and demographic locale. Second, the production of reliable, continuously measured, and accurately aggregated measurements of affective response requires large consumer panels. Third, analysis is limited to one-dimensional dial data; there is no way of collecting data on various discrete cognitive states such as excitement, happiness, and surprise, all of which might correspond to a positive valence. Further, unforeseen effects may be caused by asking a panelist to turn a dial while engaging with content. Some panelists may experience heavy cognitive load from having to manipulate a dial, which may in turn distract them from the media experience and add difficult-to-quantify noise to their response. In another case, a panelist may become engrossed in the media experience and forget to turn the dial when their affective state changes. In both cases the reports may not match their true cognitive state. That is, the act of labeling affect itself can significantly impact an individual's affect response.

The human face is a powerful channel for communicating valence as well as a wide gamut of emotion states. The Facial Action Coding System (FACS) is a detailed catalogue of unique action units that correspond to each independent motion of the face. FACS enables the measurement and scoring of facial activity in an objective, reliable, and quantitative way, and may be used to discriminate between subtle differences in facial motion. Facial behavior may be used to measure the effectiveness of media content. The general expressiveness of viewers as they view media content correlates strongly with their memory of the same content, a key measure of a successful exposure. A camera may be used to capture images of faces, and software may be used to extract FACS data or other cognitive state information from the images.

Other physiological data may also be useful in determining valence and/or determining cognitive states, the data including gestures, eye movement, sweating, galvanic skin response (GSR), heart rate, and blood pressure, among others. A variety of sensors, including heart rate monitors, blood pressure monitors, GSR sensors, or other types of sensors, can be used to capture physiological data. A camera may be useful for simultaneously capturing physiological data and facial images. The physiological data captured by the webcam can include gestures, eye movement, sweating, or even heart rate, among other physiological data. Software may be used to extract cognitive state information from the physiological data captured in an image in addition to, or in place of, the FACS data. In some embodiments, self-reported methods of capturing cognitive state information, such as the dial approach, may also be used in conjunction with cognitive state information produced from the images captured by the camera.

Once the cognitive state information has been produced, it may be used to automatically optimize the media that was presented while the cognitive state data was captured. A wide variety of things may be done to optimize the media. In some embodiments, the length of the media, or a section of the media, can be shortened based on the cognitive state information produced—for example, the length of the media may be shortened based on viewer attention levels. Also, the length of the media may be shortened to fit into a specific time allotment, such as a 30-second commercial. In some embodiments, the time at which a brand is revealed in an advertisement is automatically changed. In some embodiments, the characters or the script are changed based on attitudes inferred from the cognitive state information. A wide variety of media characteristics may be automatically optimized based on the produced cognitive state information.

Emotional state, cognitive state, mental state, and so on, are terms of art which may connote slight differences of emphasis, for example an emotional state of "happiness" vs. a cognitive state of "distractedness," but at a high level, the terms can be used interchangeably. In fact, because the human mind of an individual is often difficult to understand—even for the individual—emotional, mental, and cognitive states may easily be overlapping and appropriately used interchangeably in a general sense.

Discussed below and throughout, the analysis can include determining one or more metrics. Embodiments can include calculating a facial expression metric as part of the analyzing. The facial expression metric can include an intensity of a facial expression, a duration of a facial expression, an onset or decay of a facial expression, and so on. Embodiments include generating a cognitive state metric as part of the analyzing, based on the facial expression metric. Other metrics can be based on the audio data. The other metrics can be based on voice data within the audio data. In embodiments, the voice data enables audio vocalization metrics.

FIG. 1 is a flow diagram for advertisement optimization. The flow 100 describes a computer-implemented method for media manipulation. Data on a user who is interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content. The media can comprise an advertisement. The flow 100 includes collecting cognitive state data 110 from one or more people as they view a media presentation, analyzing the cognitive state data 120 to produce cognitive state information, and manipulating the media presentation 124 based on the cognitive state information. The collecting cognitive state data 110 may be done by any method in various embodiments, but may include capturing facial images of, and/or capturing dial settings set by, one or more people exposed to the media. In some embodiments, the media is presented more than once. In an embodiment with multiple presentations, the flow 100 further comprises collecting the cognitive state data 110 from the plurality of people for multiple viewings of the media presentation. The audience may include substantially the same plurality of people during the multiple viewings, or the audience may be substantially different for the multiple viewings. The cognitive state data may include one or more of smiles, laughter, smirks, or grimaces. In embodiments, the manipulating is based on different cognitive state content being analyzed from the multiple viewings.

In some cases, the data collected on a user interacting with a media presentation is non-facial-image data. Whereas facial image data can be very helpful for the analysis, other data, such as image data not of a face (e.g., torso image data), audio data, non-image biometric data, and so on, can be useful in the analysis. In some cases, the non-facial-image data is used to augment the facial images. In other cases, the non-facial-image data may be used to the exclusion of facial image data, for example, if facial image data were not available, or if a user was known to deliberately be providing misleading facial images. Thus, in some embodiments, the data on the user includes non-facial-image data.

The analyzing of cognitive state data 120 may include any type of analysis including computation of means, modes, standard deviations, or other statistical calculations over time. This analysis may be computed separately for different demographic groups in the audience, or it may be based on other parameters. The cognitive state data may be aggregated across a plurality of individuals and various different cognitive state data may be used to generate cognitive state information. The analyzing cognitive state data 120 may include inferring cognitive states 122, which may be a type of cognitive state information. In some embodiments, FACS data may be analyzed to infer cognitive states, such as one or more of frustration, confusion, disappointment, hesitation, cognitive overload, focusing, engagement, attention, boredom, exploration, confidence, trust, delight, disgust, skepticism, doubt, satisfaction, excitement, laughter, calmness, stress, and curiosity.

The flow 100 includes optimizing an advertisement 130 as part of the manipulating the media 124. In some embodiments, the flow 100 may include developing norms 160 based on a plurality of media presentations, and using the norms in the optimizing of the media presentation. Norms may be developed for any of the cognitive state information that may be produced and may be based on statistical calculations, such as means or modes, or may be based on selected media presentations of the plurality of media presentations that may represent targeted audience reactions. In some embodiments, the norms may be developed manually, based on desired audience reactions, using the cognitive state information produced during the presentation of the plurality of media presentations.

The flow 100 may include predicting virality 162 for the media presentation. Virality may be a measure of the likelihood of the media presentation "going viral," or being recommended by viewers to their friends by word-of-mouth, social media, email, or other means of unpaid recommendation or promotion through various media distribution channels. Various methods of predicting virality may be known in the art, such as analyzing the content for subject matter that commonly goes viral, for example, cute kittens or strange dances, looking at early download numbers after the media is posted, monitoring social media mentions, or any other method that may be useful in predicting virality.

In some embodiments, information on whether individuals from the plurality of people eventually purchase the product 164 may be collected. The purchase information may be collected after the initial collection of cognitive state data, and may be correlated using an individual, a demographic group, or another grouping. Some embodiments include collecting self-reporting information 166 from the plurality of people. The self-reporting may be obtained from dial indicators manipulated by the plurality of people during the media presentation, interviews conducted during or after the media presentation, surveys, or other types of self-reporting. In some embodiments the self-reporting includes information on whether individuals, from the plurality of people, plan to purchase the product. Some embodiments also include evaluating the media presentation based on actual sales 168. The information on actual sales may be collected after the presentation of the media to the plurality of people, before the presentation of the media, or at multiple times before, during, or after the presentation.

In embodiments, the collecting cognitive state data 110 is performed within the confines of a vehicle with one or more occupants, which uses the data for a mobile media laboratory 169. A laboratory, or lab, is a place for observation and experimentation to take place in a controlled fashion. Because the vehicle provides such an environment, it can become a mobile media lab. In embodiments, the collecting is performed within a vehicle and the analyzing, the generating, and the manipulating comprise a mobile media laboratory.

Continuing, the optimization of the advertisement 130 may be based on one or more pieces of cognitive state information produced from the cognitive state data. In some embodiments, the flow 100 may further comprise providing an engagement score 140 for the media presentation and/or providing an engagement score for portions of the media presentation. In embodiments, the engagement score can allow the optimizing to be based on engagement. The engagement score may be based directly on various action units of the FACS data, may be inferred based on other cognitive state information, or may be produced by other methods. Thus, the flow 100 may further comprise correlating facial movement to engagement 142. In some embodiments, the expressiveness score for the advertisement is calculated 144 based on total movement for faces of the plurality of people.

The flow 100 may further comprise determining a valence quotient 146. While various embodiments may use any range for the valence quotient, in some cases the valence quotient ranges from −1 to +1. Using such a scale, a negative valence quotient represents negative feelings toward the media presentation and a positive valence quotient represents positive feelings toward the media presentation. The media presentation may be optimized to keep the valence quotient away from zero and to minimize indifference toward the media presentation. Various embodiments further comprise aggregating the valence quotient 148, calculating an area-under-the-curve (AUC) value 150 for the valence quotient and/or calculating error bars 152 on the valence quotient. The aggregation, AUC value, and/or error bars may be used to guide the optimization and to help understand the validity of the calculated valence quotient.

Various types of optimization may be performed in various embodiments; the optimizing may include making recommendations for changes to the media presentation. In other embodiments, the optimizing occurs automatically under control of software running on a computer with little or no interaction with a human operator. In some embodiments, the optimizing separates a preamble from a remainder of the media presentation. In some embodiments, the optimizing selects one preamble for the media presentation from multiple possible preambles. In some cases, the optimizing correlates to viewer recall of the media presentation, while in other cases the optimizing correlates to brand recall. In various embodiments, the optimizing of the media presentation is based on multiple viewings of the media presentation, and may be based on different responses to the multiple viewings. The optimizing may be targeted for specific environments, such as optimizing for digital signage, optimizing for airport advertisements, optimizing for television viewing, optimizing for mobile viewing, or optimizing for any other environment. In some embodiments, the optimizing is based on the attention of one or more individuals, and the optimizing may be done for one or more individuals. The media presentation may be optimized based on an advertisement objective which includes one or more of a group comprising entertainment, education, awareness, persuasion, startling, and drive to action.

In some embodiments, the optimizing of the media presentation uses one or more effectiveness descriptors and an effectiveness classifier. Cognitive state information may include one or more effectiveness descriptors to analyze various affect measurements. The affect measurements may include, but are not limited to, valence and various FACS action units such as outer brow raiser action unit 2 (AU2), brow lowerer action unit 4 (AU4), lip corner puller action unit 12 (AU12), and/or other FACS action units. Some descriptors may use a scale to indicate a probability of an affect being present. For example, a value of 0% would definitively indicate that the affect is not present, and a value of 100% would definitively indicate that the affect is present. Probabilities for one or more effectiveness descriptors may vary for portions of the media presentation. Effectiveness classifiers may be created based on the effectiveness descriptors and may be based on a combination of effectiveness descriptors. In some embodiments, the effectiveness classifier is used to project the advertisement effectiveness and optimize the advertisement. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
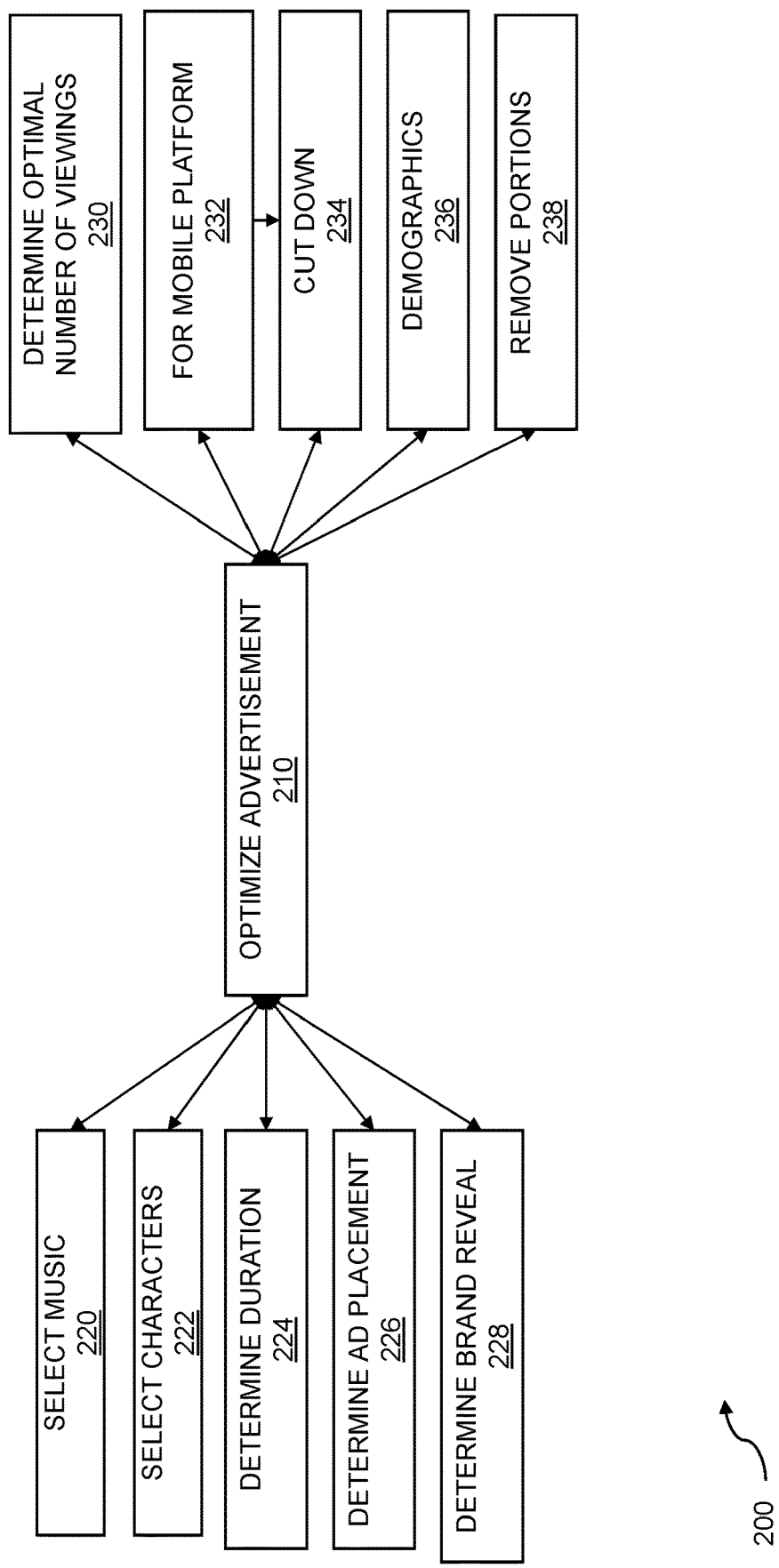
FIG. 2 is a flow diagram showing example advertisement optimization techniques.

FIG. 2 is a flow diagram 200 showing example advertisement optimization techniques. A wide variety of the advertisement's parameters may be optimized 210, only some of which may be shown in FIG. 2. The flow 200 may include selecting music 220 for the media presentation as part of the optimizing. In at least one embodiment, the media presentation may be automatically prepared with different sound tracks and cognitive state data may be collected as the different versions are presented in order to determine which music generates the most positive or negative affect data, depending on the goals of the media presentation. Other embodiments will utilize other cognitive state information or effectiveness descriptors for the optimization. The flow 200 may include selecting characters 222, actors, or roles for the media presentation as part of the optimizing. Optimizing for characters may be accomplished in a similar manner to the music optimization, with multiple versions of the media presentation created and presented with different characters. Other embodiments may use the cognitive state information produced as a character is introduced or is present in a scene for the optimization.

The flow 200 may include determining duration 224 for the media presentation as part of the optimizing. Depending on the embodiment, multiple versions of a media presentation with different lengths are created, automatically or manually, and are presented to collect cognitive state data. Alternatively, the cognitive state information of a single version may be analyzed to determine if the audience becomes bored, is expecting more plot development, or desires longer story lines. In at least one embodiment, the optimizing includes cutting down 234 an existing media presentation, which may produce a duration length that is half of an existing duration for the media presentation, a quarter of an existing duration for the media presentation, or another length. In other embodiments, the final length is predetermined, such as 30 seconds or one minute, and the optimizing may trim the media to fit the predetermined length. In some embodiments, the trimming may remove the least interesting portions, and/or may retain the most interesting portions in the resulting media presentation. The flow 200 may comprise optimizing the media presentation to remove portions 238 where cognitive state data indicates confusion, among other possibilities.

The flow 200 may further comprise determining advertisement placement 226 within the media presentation as part of the optimizing. The timing for advertisements can be chosen based on key points of interest by viewers of television programs. By selecting the correct time points, viewers can be retained through commercial breaks in a program. Mood congruency can be maintained between a program and an advertisement. Various types of cognitive state information, such as excitement, interest, or other cognitive state information, may be used to automatically determine advertisement placement. In other embodiments the media presentation may be prepared with advertisements in different locations, with cognitive state data collected in order to determine which advertisement placement generated the most desirable cognitive state information. Some embodiments may include determining brand reveal time 228 for the media presentation as part of the optimizing. Determining the brand reveal time within an advertisement may be accomplished similarly to determining advertisement placement in a longer media program. Probabilities for certain types of affect may be identified at a segment in the media presentation when a brand is revealed. The flow 200 may further comprise determining an optimal number of viewings 230 for the media presentation as part of the optimizing. Having a fewer number of exposures than the optimal number may reduce brand awareness. Have a higher number may result in fatigue and cause people to change channels or ignore advertisements. The optimal number of viewings may be determined by various methods such as presenting the same media to the same audience or individual multiple times and comparing the affect data from the various presentations.

Some embodiments may optimize for one or more demographic groups 236. Demographic groups may include, but are not limited to, groups with certain political affiliations, groups with similar interests and hobbies, groups within a certain geographic location, and groups with similar socioeconomic metrics, to name a few. For example, an advertisement can be optimized for demographic groups who are primary viewers of certain television programs. By optimizing for the appropriate demographic group of viewers, viewer interest curated during a television program can be retained through an advertisement.

In some embodiments, the media presentation is optimized for a specific platform. The optimizing may include optimizing the media presentation for a mobile platform 232 such as a mobile phone, a tablet computer, or a mobile device. Other embodiments will optimize for a home TV screen, a large movie theatre screen, or a personal computer screen. One such optimization for a particular platform or screen size may be modifying the print size in the media presentation, for example.

In some embodiments, the optimization occurs off-line after the presentation of the media. Optimization may occur in several steps where the media is presented and cognitive state data is collected and used to optimize the media. The optimized media may be presented again after the new cognitive state data has been collected and may be used to re-optimize the media. This pattern is repeated a number of times in some embodiments. In other embodiments, optimizing is performed in real time as the media presentation is being viewed. Cognitive state information that is produced for one segment of the media may be used to optimize the next segment of the media. Other embodiments may provide even more interaction between the collected cognitive state data and the media presentation. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
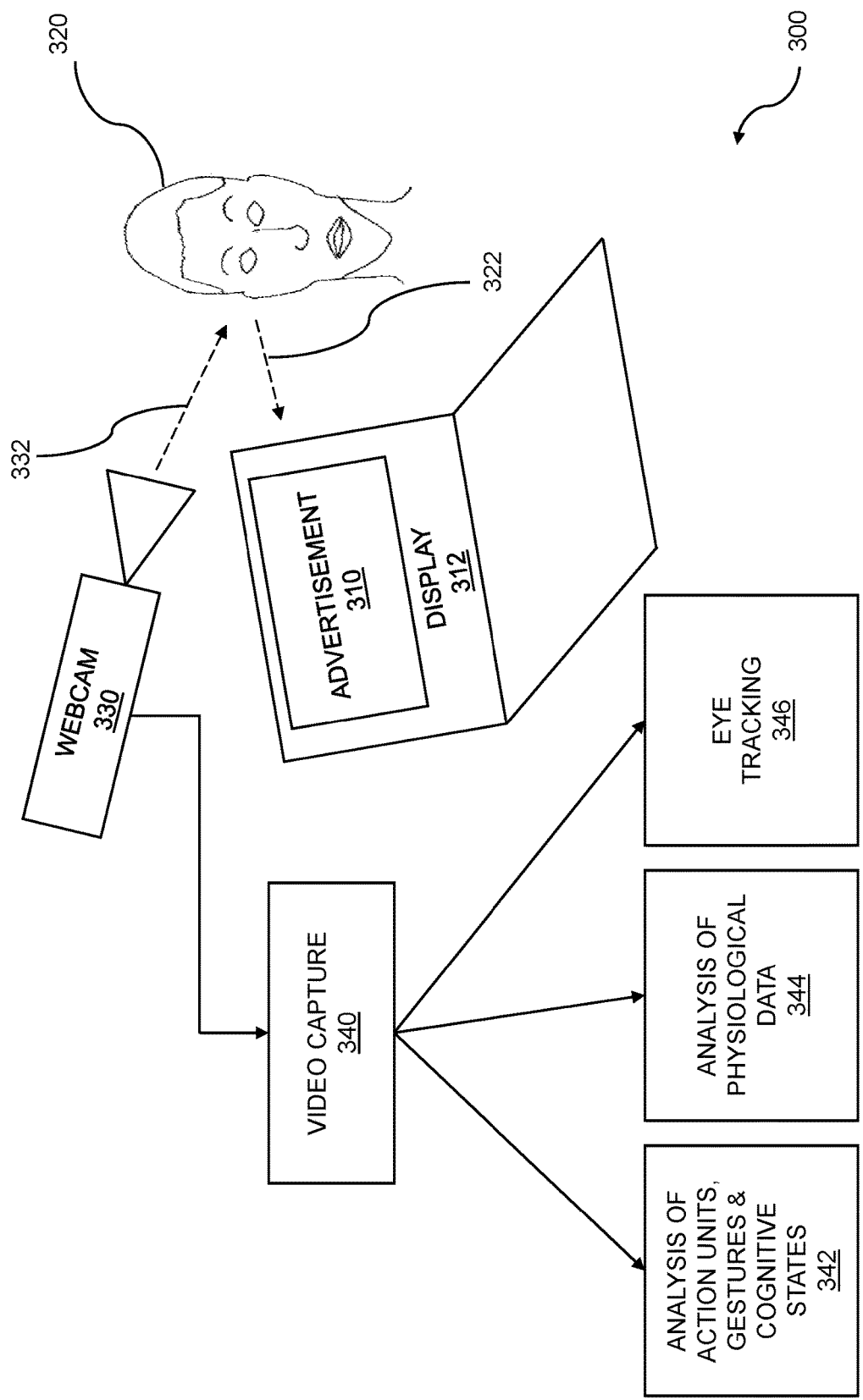
FIG. 3 is a system diagram for capturing cognitive state data.

FIG. 3 is a system diagram 300 for capturing cognitive state data. The media presentation may be viewed on an electronic display 312. The media presentation may be an advertisement 310, a TV program, a movie, or any other type of media presentation. A viewer 320 has a line of sight 322 to a display 312. While one viewer has been shown, in practical use, embodiments of the present invention may analyze groups comprising tens, hundreds, or thousands of people or more. Each viewer has a line of sight 322 to the advertisement 310 rendered on a digital display 312. An advertisement 310 may be a political advertisement, an educational advertisement, a product advertisement, a service advertisement, and so on.

The display 312 may be a television monitor, projector, computer monitor (including a laptop screen, a tablet screen, a netbook screen, and the like), a projection apparatus, a cell phone display, a mobile device, or some other electronic display. A webcam 330 is configured and disposed such that it has a line of sight 332 to the viewer 320. In one embodiment, a webcam 330 is a networked digital camera that may take still and/or moving images of the face of the viewer 320 and possibly the body of the viewer 320 as well. A webcam 330 may be used to capture one or more of the facial data and the physiological data.

The webcam 330 may refer to any camera including a webcam, a camera on a computer (such as a laptop, a netbook, a tablet, or the like), a video camera, a still camera, a cell phone camera, a mobile device camera (including, but not limited to, a forward facing camera), a thermal imager, a CCD device, a three-dimensional camera, a depth camera, multiple webcams used to show different views of the viewers, or any other type of image capture apparatus that may allow captured image data to be used in an electronic system. The facial data from the webcam 330 is received by a video capture module 340 which may decompress the video into a raw format from a compressed format such as H.264, MPEG-2, or the like. The facial data may include information on action units, head gestures, smiles, brow furrows, squints, lowered eyebrows, raised eyebrows, attention, and the like.

The raw video data may then be processed for analysis of facial data, action units, gestures, and cognitive states 342. The facial data may further comprise head gestures. The facial data itself may include information on one or more of action units, head gestures, smiles, brow furrows, squints, lowered eyebrows, raised eyebrows, attention, and the like. The action units may be used to identify smiles, frowns, and other facial indicators of cognitive states. Gestures may include a head tilt to the side, a forward lean, a smile, a frown, as well as many other gestures. Physiological data may be analyzed 344 and eyes may be tracked 346. Physiological data may be obtained through the webcam 330 without contacting the individual. Respiration, heart rate, heart rate variability, perspiration, temperature, and other physiological indicators of cognitive state may be determined by analyzing the images. The physiological data may also be obtained by a variety of sensors, such as electrodermal sensors, temperature sensors, and heart rate sensors. The physiological data may include one of a group comprising electrodermal activity, heart rate, heart rate variability, respiration, and the like.

The eye tracking 346 which, in embodiments, is performed on a viewer, may be used to identify the portion of the advertisement on which the viewer is focused. Further, in some embodiments, the process may include recording the time a viewer or viewers' eyes dwell on the rendering—eye dwell time—and associating the information on the eye dwell time to the rendering and to cognitive states of the viewers or viewer. The eye dwell time can be used to augment the cognitive state information to indicate the level of interest in certain renderings or portions of renderings. The webcam observations may include a blink rate for the eyes. For example, a reduced blink rate may indicate significant engagement in what is being observed.

Figure 4:
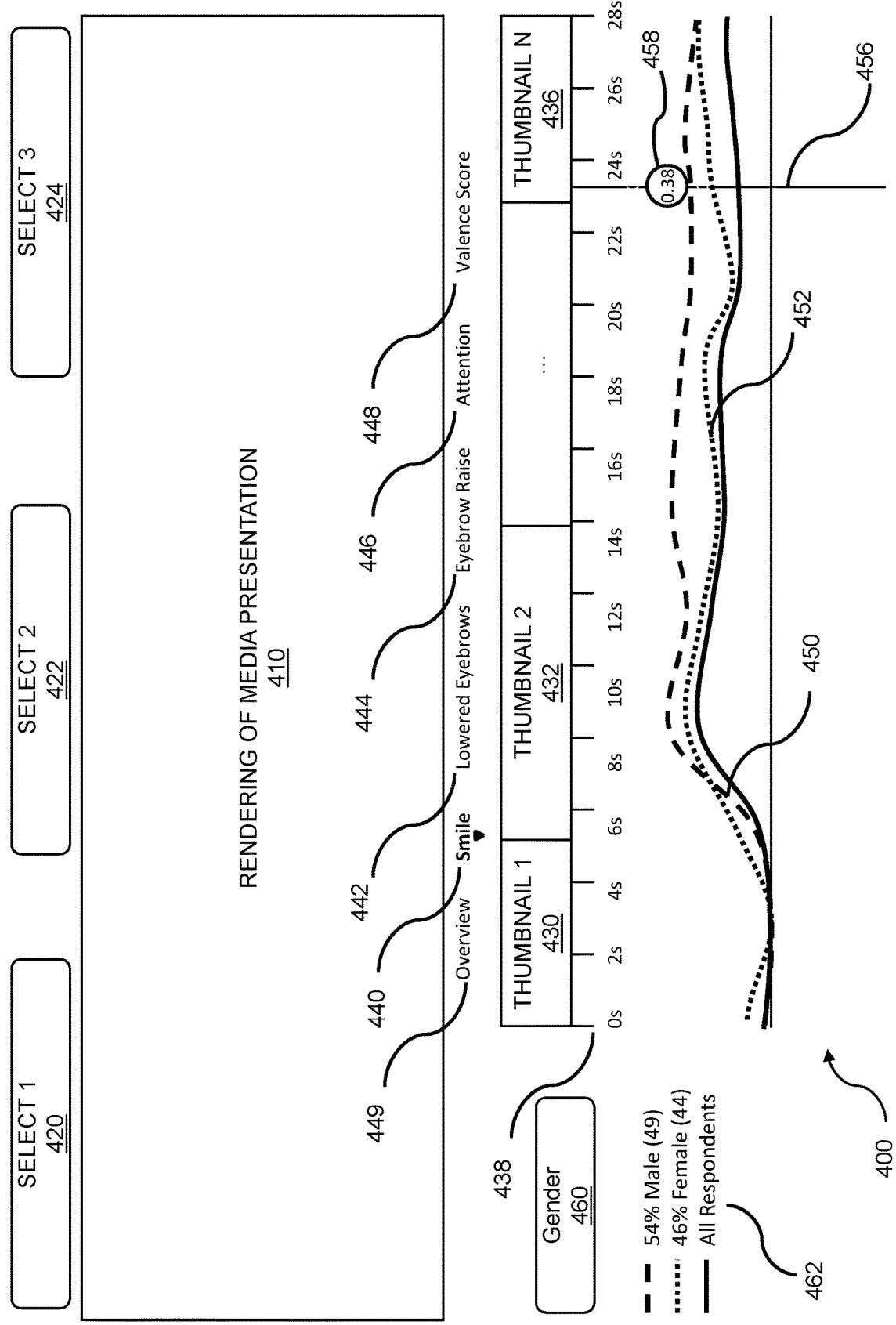
FIG. 4 is an example dashboard diagram for cognitive state analysis.

FIG. 4 shows an example dashboard diagram 400 for cognitive state analysis. The dashboard 400 may be shown on any type of display including, but not limited to, a television monitor, a projector, a computer monitor (including a laptop screen, a tablet screen, a netbook screen, and the like), a cell phone display, a mobile device, or another electronic display. A rendering of a media presentation 410 may be presented in the dashboard 400. The example dashboard 400 shown includes the media presentation 410 along with associated cognitive state information. A user may be able to select among a plurality of advertisements, products, or services using various buttons and/or tabs such as Select 1 button 420, Select 2 button 422, Select 3 button 424, and so on. Other numbers of selections are possible in various embodiments. In an alternative embodiment, a list box or drop-down menu is used to present a list of advertisements or other media presentations for display. The user interface allows a plurality of parameters to be displayed as a function of time, synchronized to the advertisement. Various embodiments have any number of selections available for the user, with some being other types of renderings instead of video, including audio, text, still images, or other types of media. A set of thumbnail images for the selected rendering—in the example shown, the thumbnails include Thumbnail 1 430, Thumbnail 2 432, through Thumbnail N 436—may be shown below the rendering along with a timeline 438. The thumbnails may show a graphic "storyboard" of the media presentation 410. In some embodiments, one or more of the thumbnails are vignettes that include motion. The storyboard may assist a user in identifying a particular scene or location within the media presentation 410. Some embodiments do not include thumbnails, or may have a single thumbnail associated with the media presentation 410. Other embodiments have thumbnails of equal length while still others have thumbnails of differing lengths. In some embodiments, the start and/or end of the thumbnails is determined based on changes in the captured viewer cognitive states associated with the rendering, while in other embodiments the start and/or end of the thumbnails is based on particular points of interest in the media presentation 410. Thumbnails of one or more viewers may be shown in addition to, or in place of, the media-presentation thumbnails 430, 432, through 436, along the timeline 438. The thumbnails of viewers may include peak expressions, expressions at key points in the advertisement, etc.

Some embodiments may include the ability for a user to select a particular type of cognitive state information for display using various buttons or other selection methods. For example, in the embodiment shown in the dashboard 400, the user previously selected the Smile button 440, because smile cognitive state information is shown. Other types of cognitive state information available for user selection in various embodiments include the Lowered Eyebrows button 442, Eyebrow Raise button 444, Attention button 446, Valence Score button 448, or other types of cognitive state information, depending on the embodiment. In embodiments, an Overview button 449, which allows a user to show graphs of the multiple types of cognitive state information simultaneously, is available. The dashboard 400 may include inferred cognitive states about the media presentation based on the cognitive state data which was collected. The cognitive states may include one or more of frustration, confusion, disappointment, hesitation, cognitive overload, focusing, engagement, attention, boredom, exploration, confidence, trust, delight, disgust, skepticism, doubt, satisfaction, excitement, laughter, calmness, stress, and curiosity. The cognitive state information may include probability information for one or more effectiveness descriptors and the probabilities for the one of the one or more effectiveness descriptors may vary for portions of the advertisement.

Because the Smile option 440 has been selected in the example shown, smile graphs are displayed. The male smile graph 450 and the female smile graph 452 are displayed in the embodiment shown, and the visual representation displays the aggregated cognitive state information. The cognitive state information may be based on various demographic groups as they react to the advertisement. The various demographic-based graphs may be indicated using various line types, as shown in FIG. 4, or may be indicated using color or another method of differentiation. A slider 456 may allow a user to select a particular time of the timeline and show the value of the chosen cognitive state for that particular time. The cognitive states can be used to analyze the effectiveness of the advertisement. The slider 456 may show the same line type or color as the demographic group whose value is shown, or the slider 456 may show another line type or color. A value 458 may be included with the slider 456 to indicate a numeric representation of a specific demographic or other line shown on the dashboard 400.

In some embodiments, various types of demographic-based cognitive state information may be selected using the demographic button 460. Such demographics may include gender, age, race, income level, education, or any other type of demographic including dividing the respondents into those respondents that had higher reactions from those with lower reactions. In the embodiment shown, the demographic button 460 has been used to select "gender." A graph legend 462 indicating the various demographic groups, the line type or color for each group, the percentage of total respondents and/or absolute number of respondents for each group, and/or other information about the demographic groups may be displayed. The cognitive state information may be aggregated according to the demographic type selected. Thus, in some embodiments, the aggregation of the cognitive state information is performed on a demographic basis so that cognitive state information is grouped based on the demographic basis.

An advertiser may be interested in observing the cognitive state of a particular demographic group, such as people of a certain age range or gender. In some embodiments, the cognitive state data may be compared with self-report data collected from the group of viewers. In this way, the analyzed cognitive states can be compared with the self-report information to see how well the two data sets correlate. In some instances, people may self-report a cognitive state other than their true cognitive state. For example, in some cases people may self-report a certain cognitive state because they feel it is the "correct" response, or they are embarrassed to report their true cognitive state. The self-report comparison can serve to identify advertisements where the analyzed cognitive state deviates from the self-reported cognitive state. The dashboard 400 and the analysis that it renders can be used to optimize the media presentation. In some cases, different versions of the media presentation are available through the select buttons. Further, there may be additional buttons for selection which allow for various types of media presentation optimizations not mentioned in this disclosure.

Figure 5:
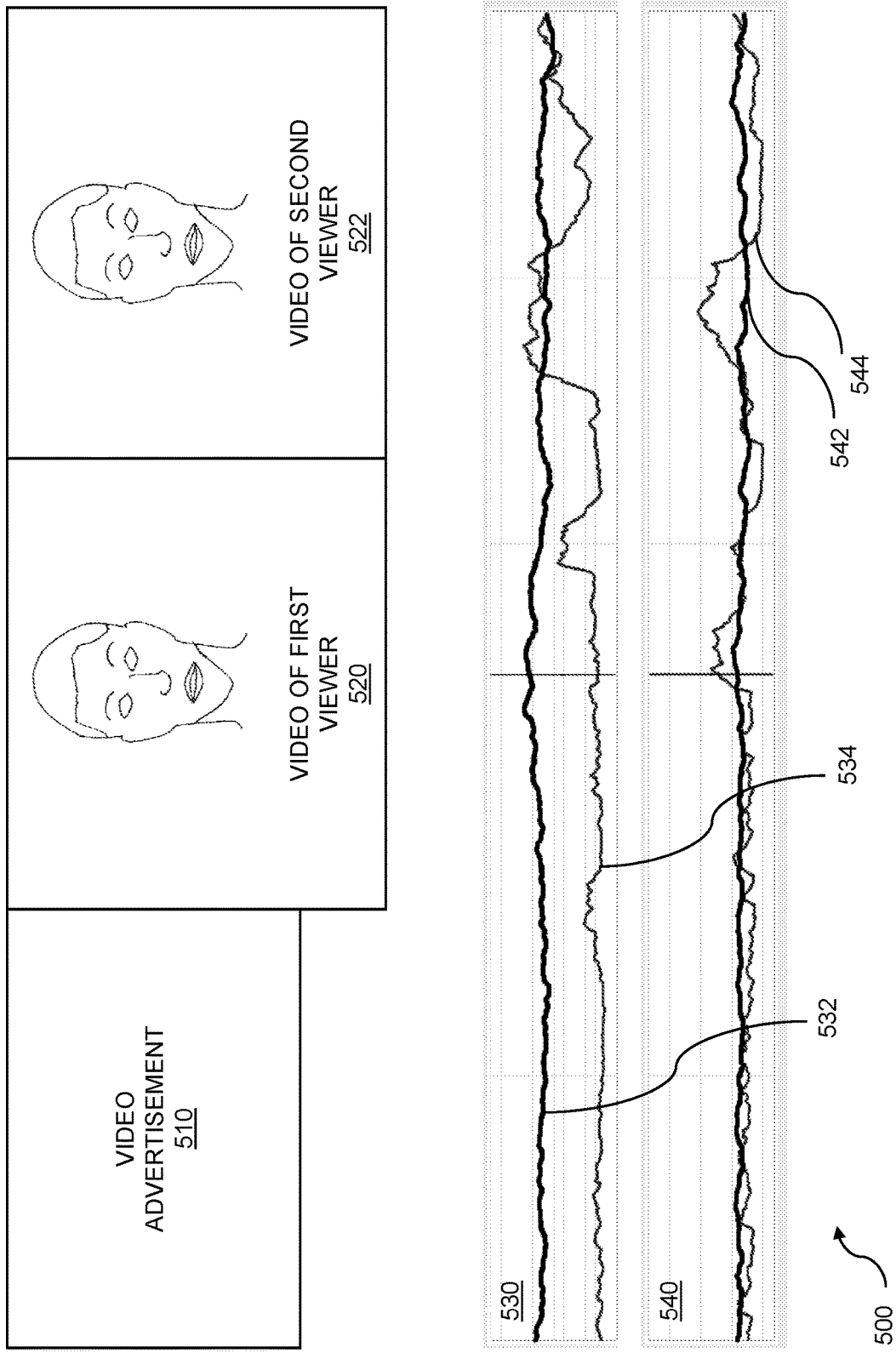
FIG. 5 is a graphical representation of cognitive state analysis.

FIG. 5 shows a graphical representation 500 of cognitive state analysis. The representation 500 may be a visualization which is presented on an electronic display. The visualization may present all or a subset of the cognitive state information as well as the advertisement or a rendering based on the advertisement. The dashboard-type representation may be used to render a cognitive state analysis on a display. A display may be a television monitor, a projector, a computer monitor (including a laptop screen, a tablet screen, a netbook screen, and the like), a projection apparatus, a cell phone display, a mobile device, or another electronic display. The representation 500 may include a video advertisement 510, a product, or a service. The video advertisement 510 may comprise a video, a still image, a sequence of still images, a set of thumbnail images, and the like. The representation 500 may also include video of a viewer or a plurality of viewers. For example, the representation 500 may include video of a first viewer 520, video of a second viewer 522, and so on. In embodiments the video for a viewer shows the viewer's reactions to the media presentation and may comprise a full motion video of the viewer, a still image of the viewer, a sequence of still images of the viewer, a set of thumbnails, and so on.

The representation 500 may allow for the comparison of graphs of various cognitive state parameters for a given user. The representation 500 may allow for the comparison of graphs of various cognitive state parameters for a plurality of viewers. The representation 500 may include inferring the viewer's cognitive states in response to the media presentation based on the cognitive state data which was collected.

The cognitive states may include one or more of frustration, confusion, disappointment, hesitation, cognitive overload, focusing, engagement, attention, boredom, exploration, confidence, trust, delight, disgust, skepticism, doubt, satisfaction, excitement, laughter, calmness, stress, and curiosity.

In some embodiments, collected cognitive state information, such as FACS action unit data, is selected for display. For example, a graph 530 may be a graphical representation of two parameters, AU4 532 and AU12 534, for the first viewer 520. Similarly, a graph 540 may be a graphical representation of two parameters, AU4 542 and AU12 544, for a second viewer 522. The graphs 530 and 540 may relate to probabilities, and in embodiments, the probabilities for one of the one or more effectiveness descriptors vary for portions of the advertisement, product, or service. Multiple other advertisement videos, video clips, still images, and the like may be shown.

For example, an advertising team may wish to test the effectiveness of an advertisement. An advertisement may be shown to a plurality of viewers in a focus group setting. The advertising team may notice an inflection point, such as a smile line, in one or more of the curves. The advertising team can then identify which point in the advertisement, in this example a product advertisement, invoked viewer smiles. Thus, content can be identified by the advertising team as being effective, or at least able drawing a positive response. In this manner, viewer response can be obtained and analyzed. Once the viewer response has been analyzed, the advertisement 510 may be automatically optimized based on the viewer response.

Figure 6:
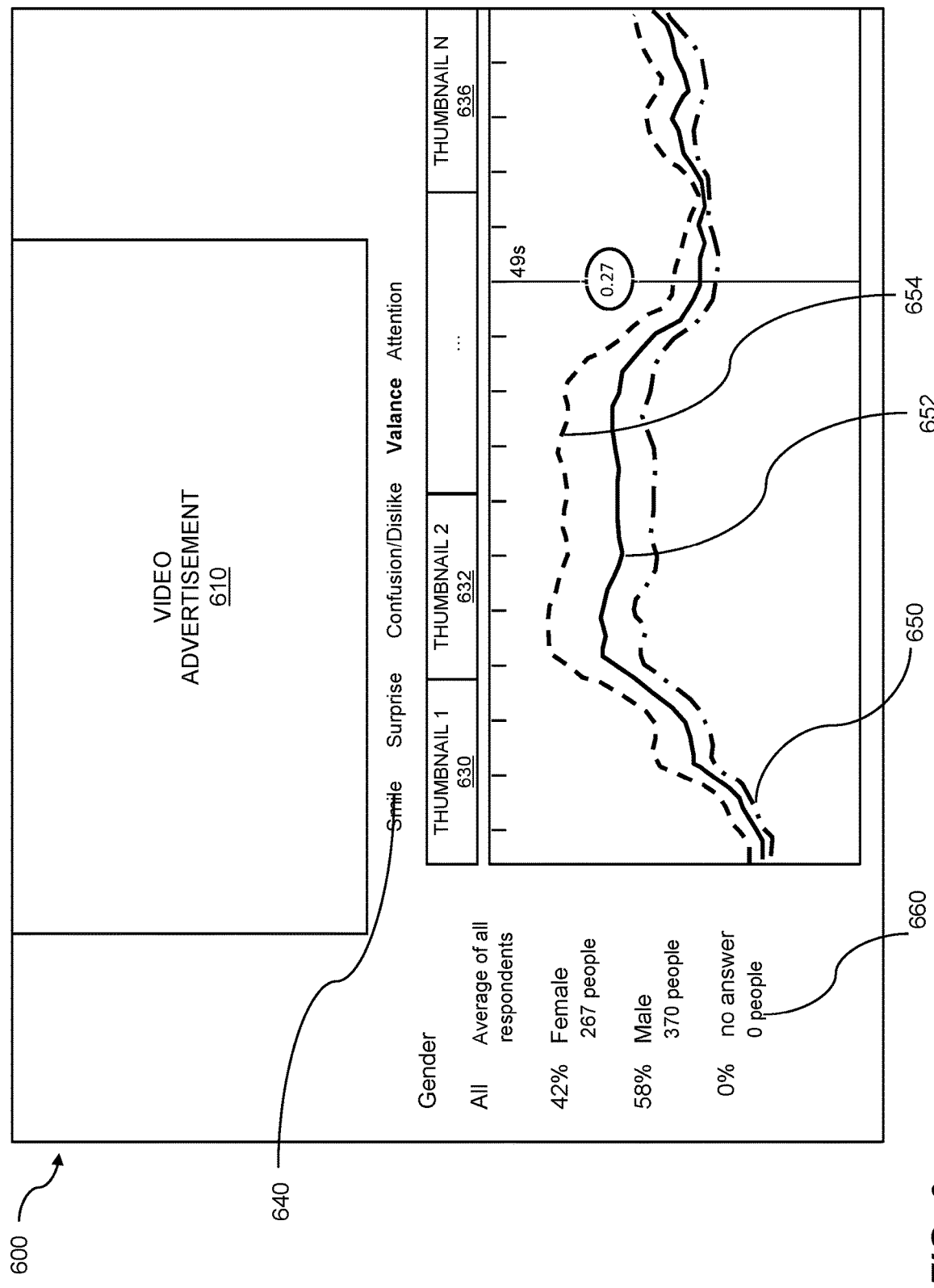
FIG. 6 is an example advertisement dashboard for cognitive state analysis.

FIG. 6 shows an example advertisement dashboard 600 for cognitive state analysis. The dashboard 600 may include a video advertisement 610 and buttons 640 to allow different cognitive state information to be displayed. In the dashboard 600, the valence button has been selected. A graph 650 shows the valence of male viewers, a graph 654 shows the valence of female viewers, and a graph 652 shows the valence of the complete group of viewers through the duration of the video advertisement 610. A graph legend 660 may show how the various graphs are depicted and may provide more information, such as the number of viewers in each demographic group. A set of thumbnail images for the selected rendering—in the example shown, the thumbnails Thumbnail 1 630, Thumbnail 2 632, through Thumbnail N 636—may be shown below the rendering.

The cognitive state information may be used to automatically optimize the advertisement 610, and the optimizing may be done for a group of people. In various embodiments, the group represents a demographic group and/or a group which resides or works in a certain locale. The dashboard 600 may be used to identify the time of peak valence or other affect within an advertisement. By ensuring that peak valence occurs late in an advertisement and during brand reveal, an advertisement can be optimized to have the most impact. Based on this impact, sales should increase. In some embodiments, sales can be predicted based on collecting previous sales analyses and corresponding cognitive state data. A profile may be calculated for certain types of affect as it pertains to sales. The profile may include a graph or graph-like summary. The cognitive state data can be binned into discrete time regions. Based on one or more profiles, clustering or patterns can be recognized. Peak intensities can be evaluated within the discrete time intervals for certain affect measures. Two, three, or more groups of clusters can be recognized. For example, a group of high-performing advertisements can be determined along with a group of poorly performing advertisements where performance correlates to sales outcomes. Distance metrics can be evaluated for the groups where a smallest distance that contains a group is found, and the biggest distance is evaluated between the groups. A predictive trait may be identified for the affect-based sales information. Validation on the predictive trait can be performed using various techniques including a "leave one out" cross validation. The predication capability can be further analyzed with self-report data.

Figure 7:
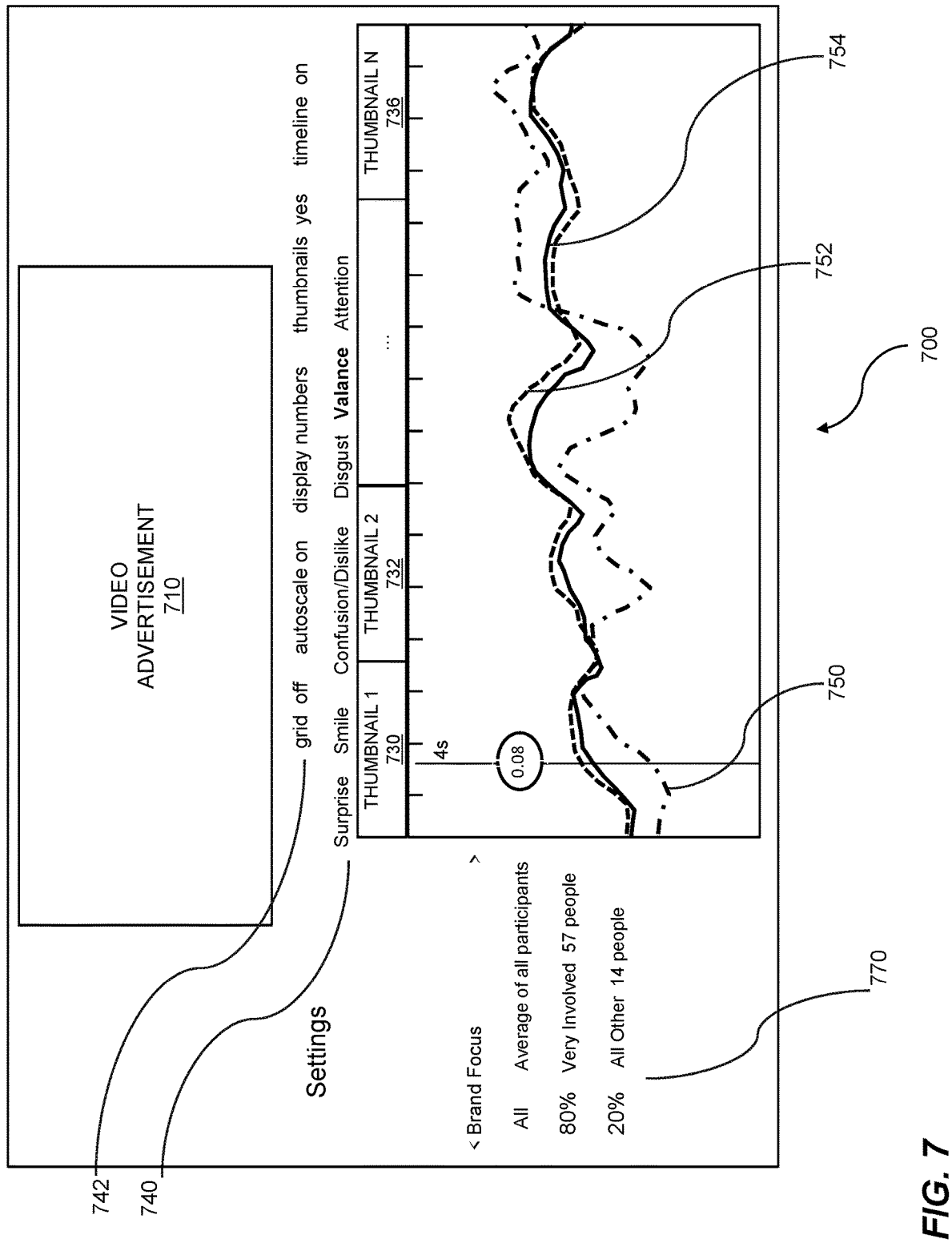
FIG. 7 is an example advertisement dashboard for valence analysis.

FIG. 7 shows an example advertisement dashboard 700 for valence analysis. The dashboard 700 may include a video advertisement 710 and buttons 740 to allow different cognitive state information to be displayed. In the dashboard 700 shown, the valence button has been selected, as well as the settings button to display various settings 742. A graph 750 shows the valence of viewers that were not very involved, a graph 752 shows the valence of viewers that were very involved, and a graph 754 shows the valence of the complete group of viewers through the duration of the video advertisement 710. A graph legend 770 may show how the various graphs are depicted and may provide more information such as the number of viewers in each demographic group. A set of thumbnail images for the selected rendering—in the example shown, the thumbnails include Thumbnail 1 730, Thumbnail 2 732, through Thumbnail N 736—may be shown below the rendering. The dashboard 700 may be used to analyze the amount of engagement for viewers of an advertisement. By optimizing the advertisement, viewer engagement can be increased. In addition, a trend over time can be observed and used to promote increased valence or engagement as advertisement progresses, in the case of a previously optimized advertisement.

The optimizing of the video advertisement 710 may be performed in a way that includes the most interesting portions of the video advertisement. In some embodiments, identifying the most interesting portions may be based on valence. Optimizing the video advertisement 710 may delete the least interesting portions of the video advertisement. In some embodiments, the identifying of the least interesting portions may be based on valence. In some embodiments, valence may have a range that is below zero for negative feelings toward the video advertisement 710 and above zero for positive feelings toward the video advertisement 710. The portions of the advertisement identified as most interesting may be labeled as such based on an absolute valence value indicating that the viewer is not indifferent toward the video advertisement 710. The segments of the advertisement with an absolute valence score closest to zero may be identified as the least interesting portions of the advertisement.

Figure 8:
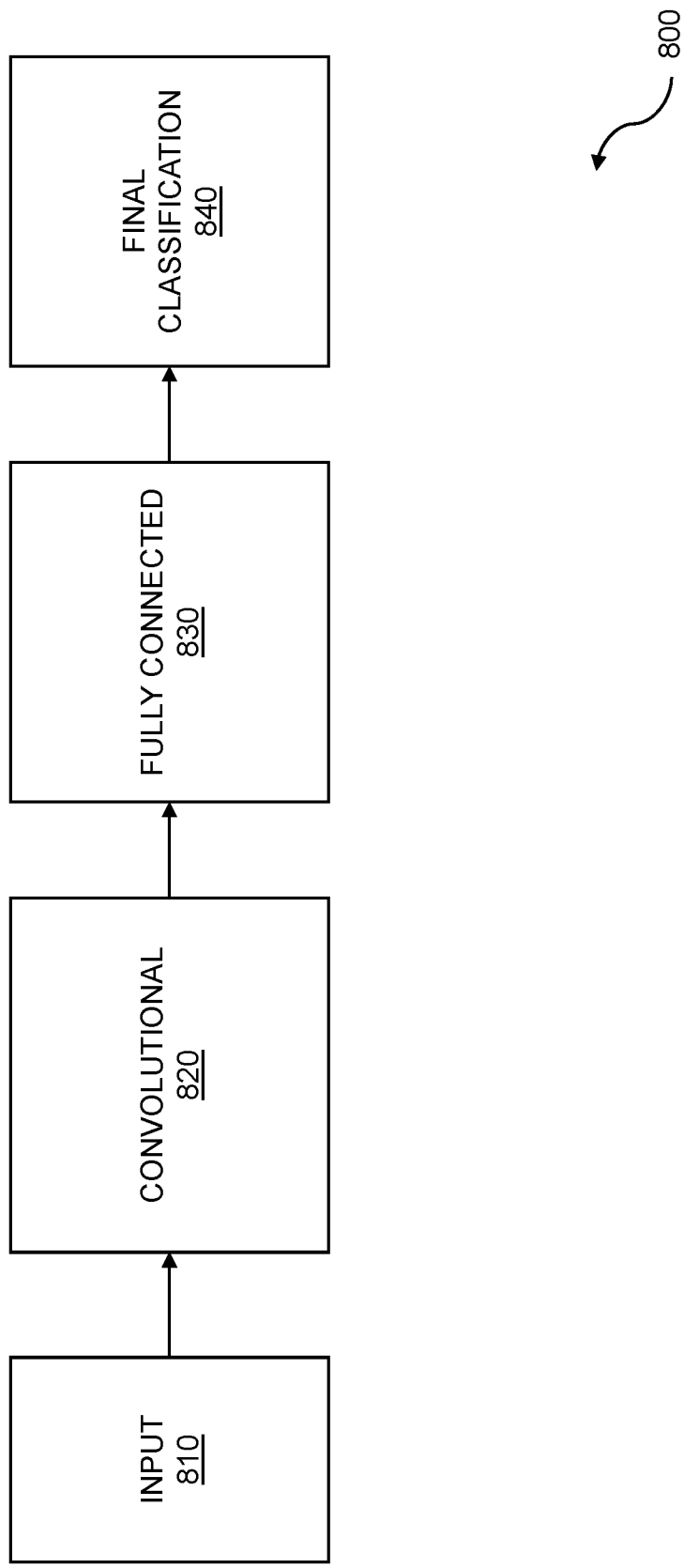
FIG. 8 is an example showing a pipeline for facial analysis layers.

FIG. 8 is an example showing a pipeline for facial analysis layers. A pipeline of facial analysis layers can be applied to media manipulation using cognitive state metric analysis. For example, a computer is initialized for convolutional neural network processing. A plurality of images for processing on the computer is obtained, using an imaging device. A multilayered analysis engine is trained on the computer, using the plurality of images. The multilayered analysis engine includes multiple layers that include one or more convolutional layers, one or more hidden layers, and at least one output layer. A further image is evaluated, using the multilayered analysis engine. The evaluating includes identifying a facial portion and identifying a facial expression based on the facial portion. The convolutional neural network analysis is output from the output layer. The example 800 includes an input layer 810. The input layer 810 receives image data. The image data can be input in a variety of formats, such as JPEG, TIFF, BMP, and GIF. Compressed image formats can be decompressed into arrays of pixels, wherein each pixel can include an RGB tuple. The input layer 810 can then perform processing such as identifying boundaries of the face, identifying landmarks of the face, extracting features of the face, and/or rotating a face within the plurality of images. The output of the input layer can then be input to a convolutional layer 820. The convolutional layer 820 can represent a convolutional neural network and can contain a plurality of hidden layers. A layer from the multiple layers can be fully connected. The convolutional layer 820 can reduce the amount of data feeding into a fully connected layer 830. The fully connected layer processes each pixel/data point from the convolutional layer 820. A last layer within the multiple layers can provide output indicative of a certain cognitive state. The last layer is the final classification layer 840. The output of the final classification layer 840 can be indicative of the cognitive states of faces within the images that are provided to input layer 810.

Figure 9:
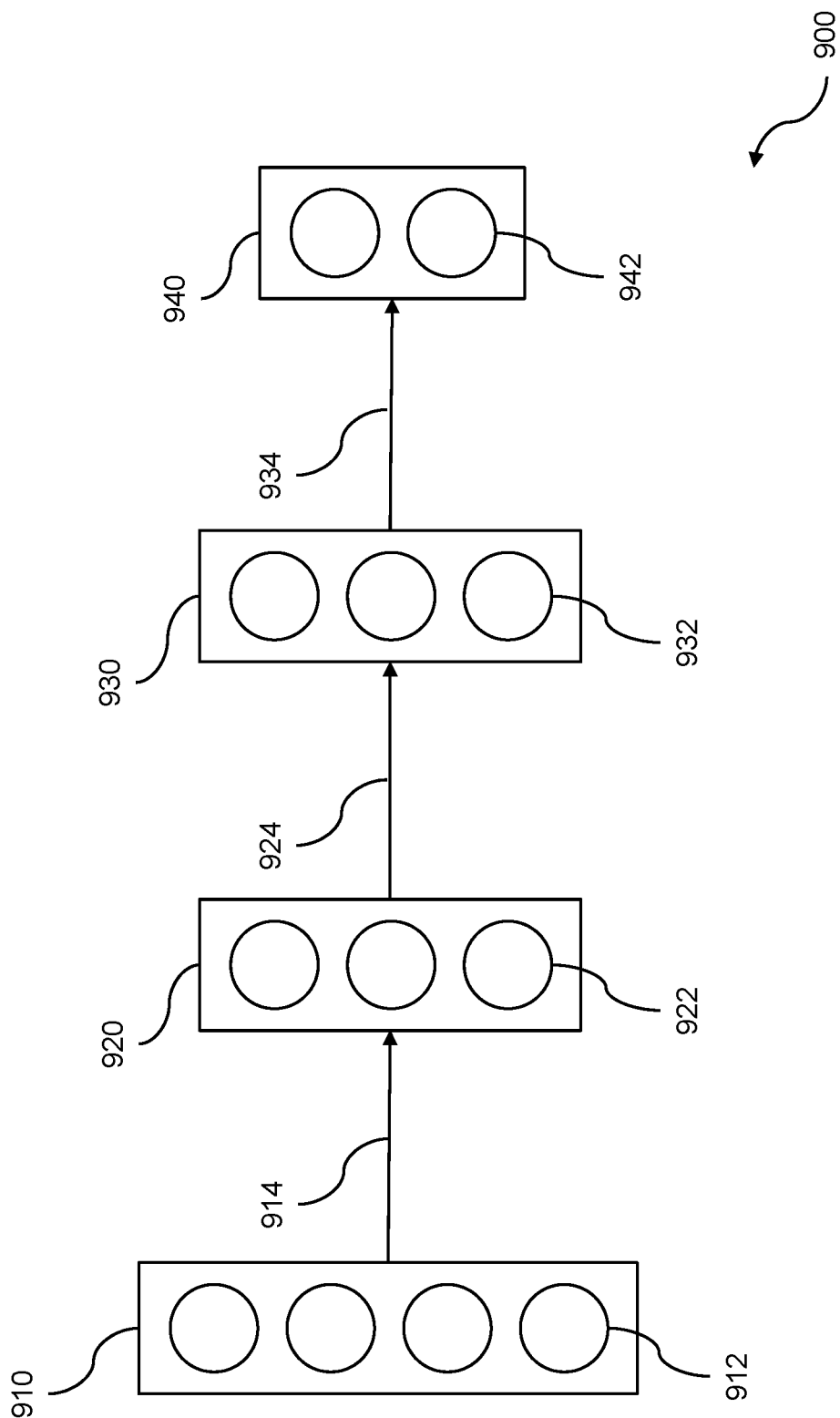
FIG. 9 is an example illustrating a deep network for facial expression parsing.

FIG. 9 is an example 900 illustrating a deep network for facial expression parsing. Facial expression parsing using neural networks can be applied to media manipulation using cognitive state metric analysis. Data on a user interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content. A first layer 910 of the deep network is comprised of a plurality of nodes 912. Each of nodes 912 serves as a neuron within a neural network. The first layer can receive data from an input layer. The output of the first layer 910 feeds to the next layer 920. The layer 920 further comprises a plurality of nodes 922. A weight 914 adjusts the output of the first layer 910 which is being input to the layer 920. In embodiments, the layer 920 is a hidden layer. The output of the layer 920 feeds to a subsequent layer 930. That layer 930 further comprises a plurality of nodes 932. A weight 924 adjusts the output of the second layer 920 which is being input to the third layer 930. In embodiments, the third layer 930 is also a hidden layer. The output of the third layer 930 feeds to a fourth layer 940 which further comprises a plurality of nodes 942. A weight 934 adjusts the output of the third layer 930 which is being input to the fourth layer 940. The fourth layer 940 can be a final layer, providing a facial expression and/or cognitive state as its output. The facial expression can be identified using a hidden layer from the one or more hidden layers. The weights can be provided on inputs to the multiple layers to emphasize certain facial features within the face. The training can comprise assigning weights to inputs on one or more layers within the multilayered analysis engine. In embodiments, one or more of the weights (914, 924, and/or 934) can be adjusted or updated during training. The assigning weights can be accomplished during a feed-forward pass through the multilayered analysis engine. In a feed-forward arrangement, the information moves forward from the input nodes through the hidden nodes and on to the output nodes. Additionally, the weights can be updated during a back-propagation process through the multilayered analysis engine.

Figure 10:
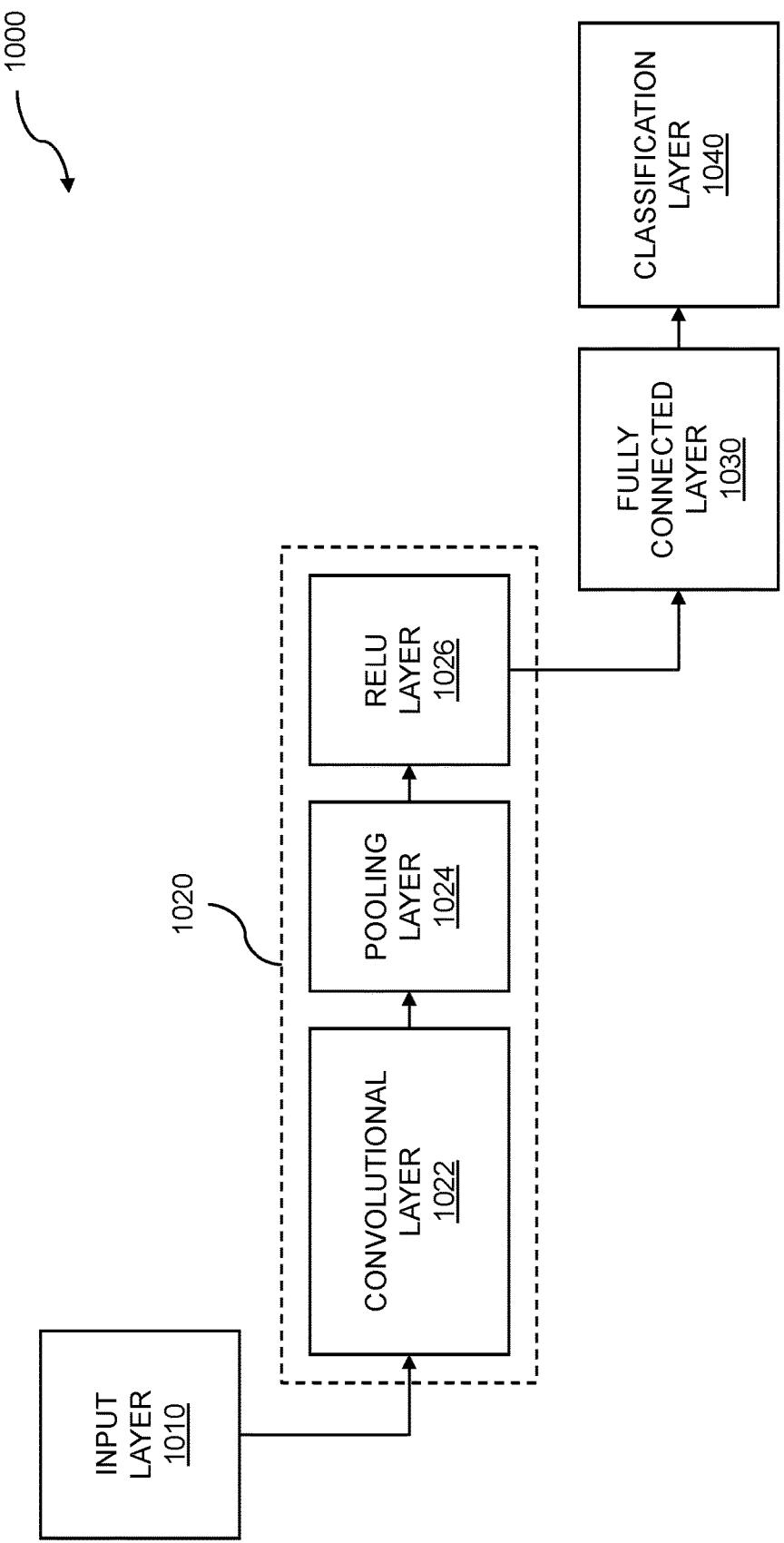
FIG. 10 is an example illustrating a convolution neural network.

FIG. 10 is an example illustrating a convolution neural network (CNN). A convolutional neural network such as the network 1000 can be used for deep learning, where the deep learning can be applied to media manipulation using cognitive state metric analysis. Data on a user interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content. The convolutional neural network analysis is output from the output layer. The convolutional neural network can be applied to such tasks as cognitive state analysis, mental state analysis, mood analysis, emotional state analysis, and so on. Cognitive state data can include mental processes, where the mental processes can include attention, creativity, memory, perception, problem solving, thinking, use of language, and the like.

Cognitive analysis is a very complex task. Understanding and evaluating moods, emotions, mental states, or cognitive states, requires a nuanced evaluation of facial expressions or other verbal and nonverbal cues that people generate. Cognitive state analysis is important in many areas such as research, psychology, business, intelligence, law enforcement, and so on. The understanding of cognitive states can be useful for a variety of business purposes such as improving marketing analysis, assessing the effectiveness of customer service interactions and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can boost ticket sales and/or advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal. Thus, by analyzing facial expressions en masse in real time, important information regarding the general cognitive state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, cognitive states, physiological data, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including physiological data can be collected, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the proliferating capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying cognitive states, moods, mental states, emotional states, and so on, from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, volume, speech rate, or language content. The voice data analysis can be used to determine one or more cognitive states, moods, mental states, emotional states, etc.

The artificial neural network, such as a convolutional neural network which forms the basis for deep learning, is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of the cognitive states of faces within the images that are provided to the input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a cognitive state, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 10 is an example showing a convolutional neural network 1000. The convolutional neural network can be used for deep learning, where the deep learning can be applied to avatar image animation using translation vectors. The deep learning system can be accomplished using a convolutional neural network or other techniques. The deep learning can perform facial recognition and analysis tasks. The network includes an input layer 1010. The input layer 1010 receives image data. The image data can be input in a variety of formats, such as JPEG, TIFF, BMP, and GIF. Compressed image formats can be decompressed into arrays of pixels, wherein each pixel can include an RGB tuple. The input layer 1010 can then perform processing such as identifying boundaries of the face, identifying landmarks of the face, extracting features of the face, and/or rotating a face within the plurality of images.

The network includes a collection of intermediate layers 1020. The multilayered analysis engine can include a convolutional neural network. Thus, the intermediate layers can include a convolutional layer 1022. The convolutional layer 1022 can include multiple sublayers, including hidden layers within it. The output of the convolutional layer 1022 feeds into a pooling layer 1024. The pooling layer 1024 performs a data reduction, which makes the overall computation more efficient. Thus, the pooling layer reduces the spatial size of the image representation to reduce the number of parameters and computations in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer as part of pooling layer 1024. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (RELU) layer 1026. The output of the pooling layer 1024 can be input to the RELU layer 1026. In embodiments, the RELU layer implements an activation function such as $f(x)=\max(0,x)$, thus providing an activation with a threshold at zero. In some embodiments, the RELU layer 1026 is a leaky RELU layer. In this case, instead of the activation function providing zero when x<0, a small negative slope is used, resulting in an activation function such as f(x)=1(x<0)(αx)+1(x>=0)(x). This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 1022 and one or more hidden layers, and wherein the multilayered analysis engine can be used for emotional analysis.

The example 1000 includes a fully connected layer 1030. The fully connected layer 1030 processes each pixel/data point from the output of the collection of intermediate layers 1020. The fully connected layer 1030 takes all neurons in the previous layer and connects them to every single neuron it has. The output of the fully connected layer 1030 provides input to a classification layer 1040. The output of the classification layer 1040 provides a facial expression and/or cognitive state. Thus, a multilayered analysis engine such as the one depicted in FIG. 10 processes image data using weights, models the way the human visual cortex performs object recognition and learning, and effectively analyzes image data to infer facial expressions and cognitive states.

Machine learning for generating parameters, analyzing data such as facial data and audio data, and so on, can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy, whether a voice is female, male, or robotic, whether a message is legitimate email or a "spam" message, and so on. The data can include unstructured data and can be of large quantity. The algorithms that can be generated by machine learning techniques are particularly useful to data analysis because the instructions that comprise the data analysis technique do not need to be static. Instead, the machine learning algorithm or model, generated by the machine learning technique, can adapt. Adaptation of the learning algorithm can be based on a range of criteria such as success rate, failure rate, and so on. A successful algorithm is one that can adapt—or learn—as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take actions in an environment. The actions taken by the agents should maximize a goal such as a "cumulative reward". A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and suboptimal actions are not explicitly corrected. Rather, on-line or computational performance is the focus. On-line performance includes finding a balance between exploration of new (uncharted) territory or spaces and exploitation of current knowledge. That is, there is a tradeoff between exploration and exploitation.

Machine learning based on reinforced learning adjusts or learns based on learning an action, a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, cognitive state, etc., of an individual, then a positive mood, emotional state, mental state, or cognitive state can be used to adjust the model and algorithm. Positive outcomes can include the person being more engaged, where engagement is based on affect, the person spending more time playing an online game or navigating a webpage, the person converting by buying a product or service, and so on. The reinforced learning can be based on exploring a solution space and adapting the model, algorithm, etc., based on outcomes of the exploration. When positive outcomes are encountered, the positive outcomes can be reinforced by changing weighting values within the model, algorithm, etc. Positive outcomes may result in increasing weighting values. Negative outcomes can also be considered, where weighting values may be reduced or otherwise adjusted.

Figure 11:
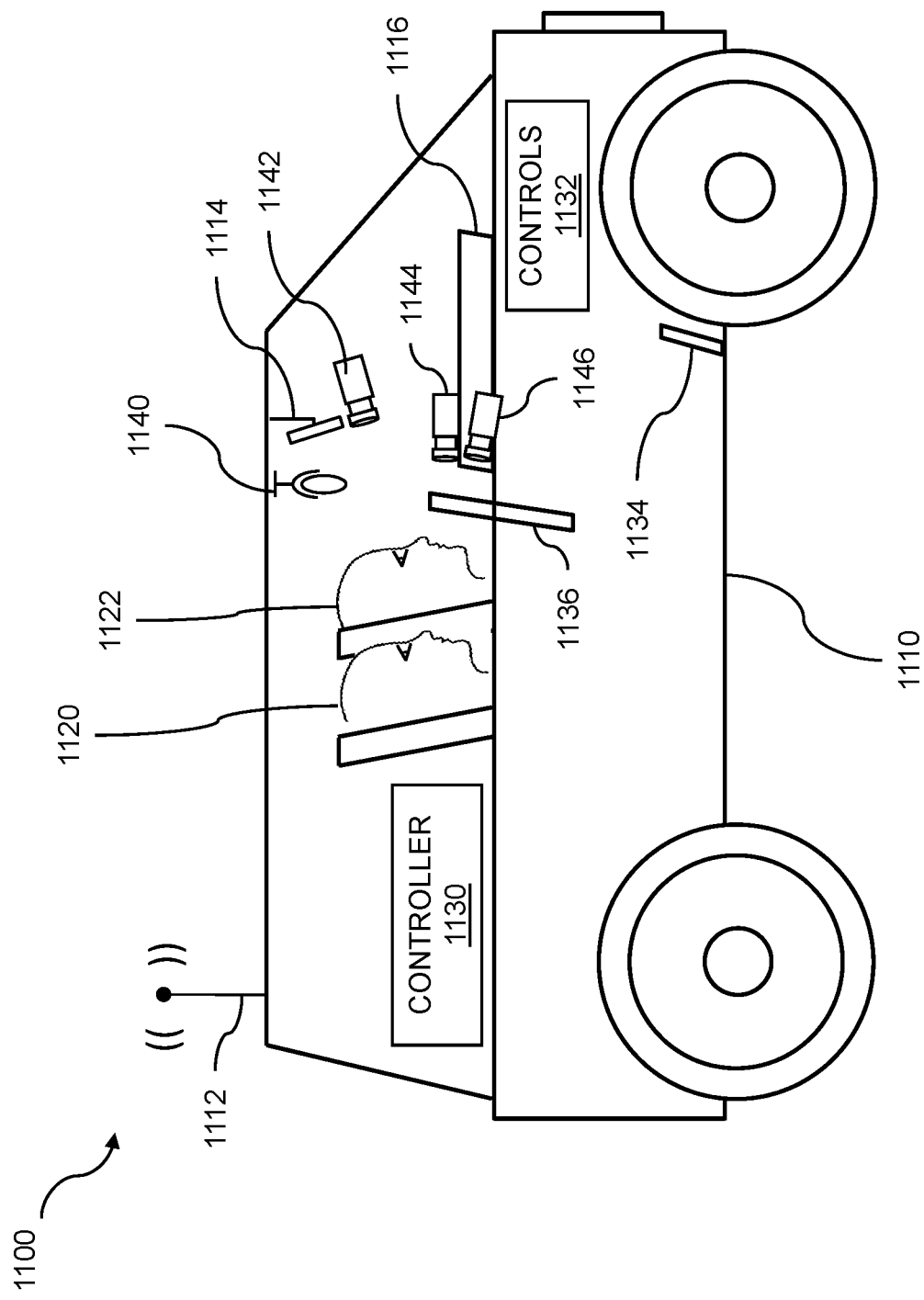
FIG. 11 is a system diagram for an interior of a vehicle.

FIG. 11 is a system diagram for an interior of a vehicle 1100. A vehicle can be used as a mobile media laboratory for media manipulation using cognitive state metric analysis. Data on a user interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content. One or more occupants of a vehicle 1110, such as occupants 1120 and 1122, can be observed using a microphone 1140, one or more cameras 1142, 1144, or 1146, and other audio and image capture techniques. The image data can include video data. The video data and the audio data can include cognitive state data, where the cognitive state data can include facial data, voice data, physiological data, and the like. The occupant can be a driver occupant 1122 of the vehicle 1110, a passenger occupant 1120 within the vehicle, and so on.

The cameras or imaging devices that can be used to obtain images including facial data from the occupants of the vehicle 1110 can be positioned to capture the face of the vehicle operator, the face of a vehicle passenger, multiple views of the faces of occupants of the vehicle, and so on. The cameras can be located near a rear-view mirror 1114, such as camera 1142, positioned near or on a dashboard 1116, such as camera 1144, positioned within the dashboard, such as camera 1146, and so on. The microphone, or audio capture device, 1140 can be positioned within the vehicle such that voice data, speech data, non-speech vocalizations, and so on, can be easily collected with minimal background noise. In embodiments, additional cameras, imaging devices, microphones, audio capture devices, and so on, can be located throughout the vehicle. In further embodiments, each occupant of the vehicle could have multiple cameras, microphones, etc., positioned to capture video data and audio data from that occupant.

The interior of a vehicle 1110 can be a standard vehicle, an autonomous vehicle, a semi-autonomous vehicle, and so on. The vehicle can be a sedan or other automobile, a van, a sport utility vehicle (SUV), a truck, a bus, a special purpose vehicle, and the like. The interior of the vehicle 1110 can include standard controls such as a steering wheel 1136, a throttle control (not shown), a brake 1134, and so on. The interior of the vehicle can include other controls 1132 such as controls for seats, mirrors, climate adjustments, audio systems, etc. The controls 1132 of the vehicle 1110 can be controlled by a controller 1130. The controller 1130 can control the vehicle 1110 in various manners such as autonomously, semi-autonomously, assertively to a vehicle occupant 1120 or 1122, etc. In embodiments, the controller provides vehicle control techniques, assistance, etc. The controller 1130 can receive instructions via an antenna 1112 or using other wireless techniques. The controller 1130 can be preprogrammed to cause the vehicle to follow a specific route. The specific route that the vehicle is programmed to follow can be based on the cognitive state of the vehicle occupant. The specific route can be chosen based on lowest stress, least traffic, best view, shortest route, and so on.

Figure 12:
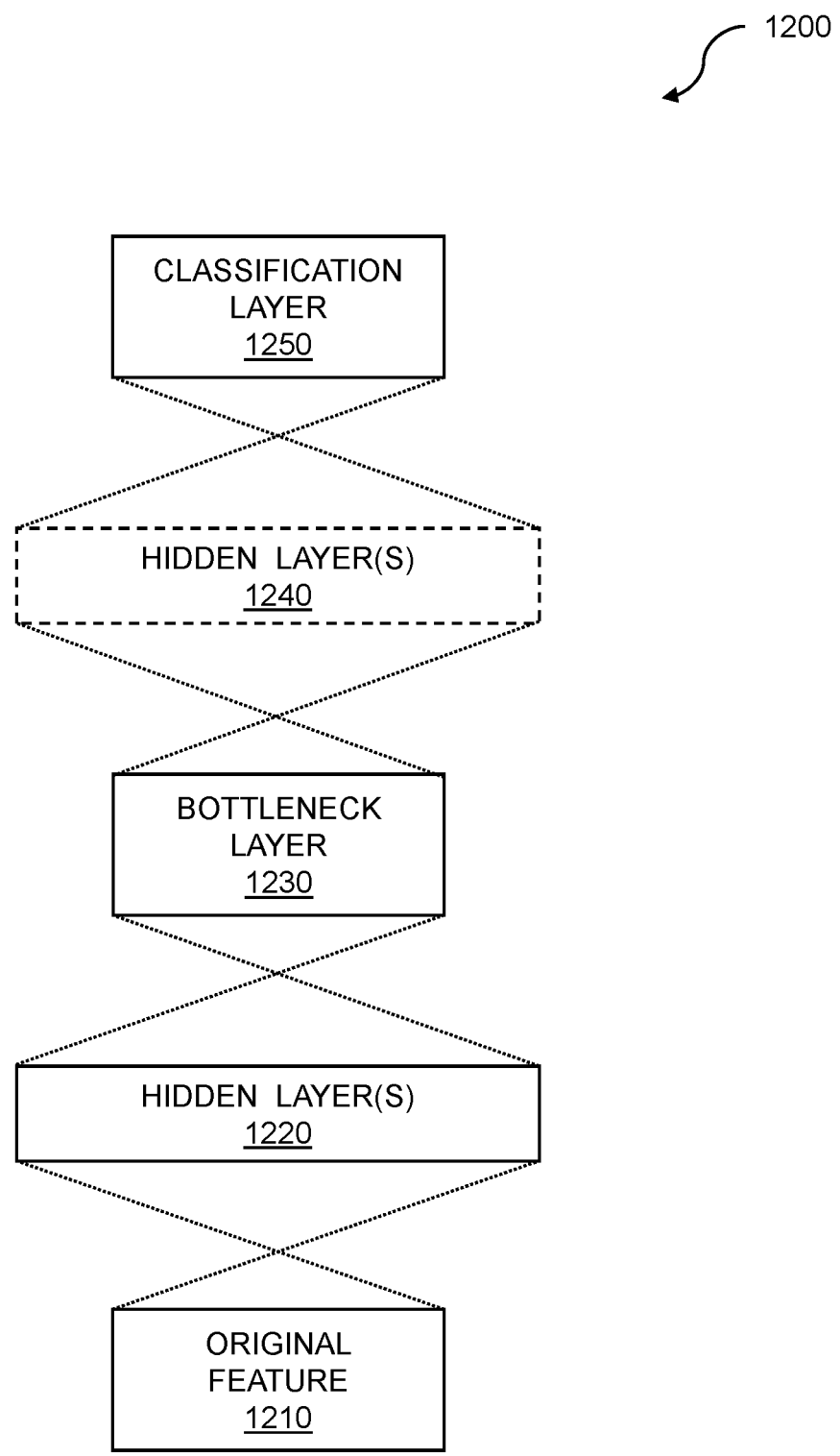
FIG. 12 illustrates a bottleneck layer within a deep learning environment.

FIG. 12 illustrates a bottleneck layer within a deep learning environment. A plurality of layers in a deep neural network (DNN) can include a bottleneck layer. The deep neural network can comprise a convolutional neural network. The bottleneck layer can be used for media manipulation using cognitive state metric analysis. A deep neural network can apply classifiers such as image classifiers, audio classifiers, and so on. The classifiers can be learned by analyzing cognitive state data. Data on a user interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content.

Layers of a deep neural network can include a bottleneck layer 1200. A bottleneck layer can be used for a variety of applications such as facial recognition, voice recognition, emotional state recognition, and so on. The deep neural network in which the bottleneck layer is located can include a plurality of layers. The plurality of layers can include an original feature layer 1210. A feature such as an image feature can include points, edges, objects, boundaries between and among regions, properties, and so on. The deep neural network can include one or more hidden layers 1220. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral voice to an emotional or expressive voice. Specifically, activations of the bottleneck layer determine how the transformation occurs. A single bottleneck layer can be trained to transform a neutral face or voice to a different emotional face or voice. In some cases, an individual bottleneck layer can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1230. The bottleneck layer can include a fewer number of nodes than the one or more preceding hidden layers. The bottleneck layer can create a constriction in the deep neural network or other network. The bottleneck layer can force information that is pertinent to a classification, for example, into a low dimensional representation. The bottleneck features can be extracted using an unsupervised technique. In other embodiments, the bottleneck features can be extracted using a supervised technique. The supervised technique can include training the deep neural network with a known dataset. The features can be extracted from an autoencoder such as a variational autoencoder, a generative autoencoder, and so on. The deep neural network can include hidden layers 1240. The number of the hidden layers can include zero hidden layers, one hidden layer, a plurality of hidden layers, and so on. The hidden layers following the bottleneck layer can include more nodes than the bottleneck layer. The deep neural network can include a classification layer 1250. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 13:
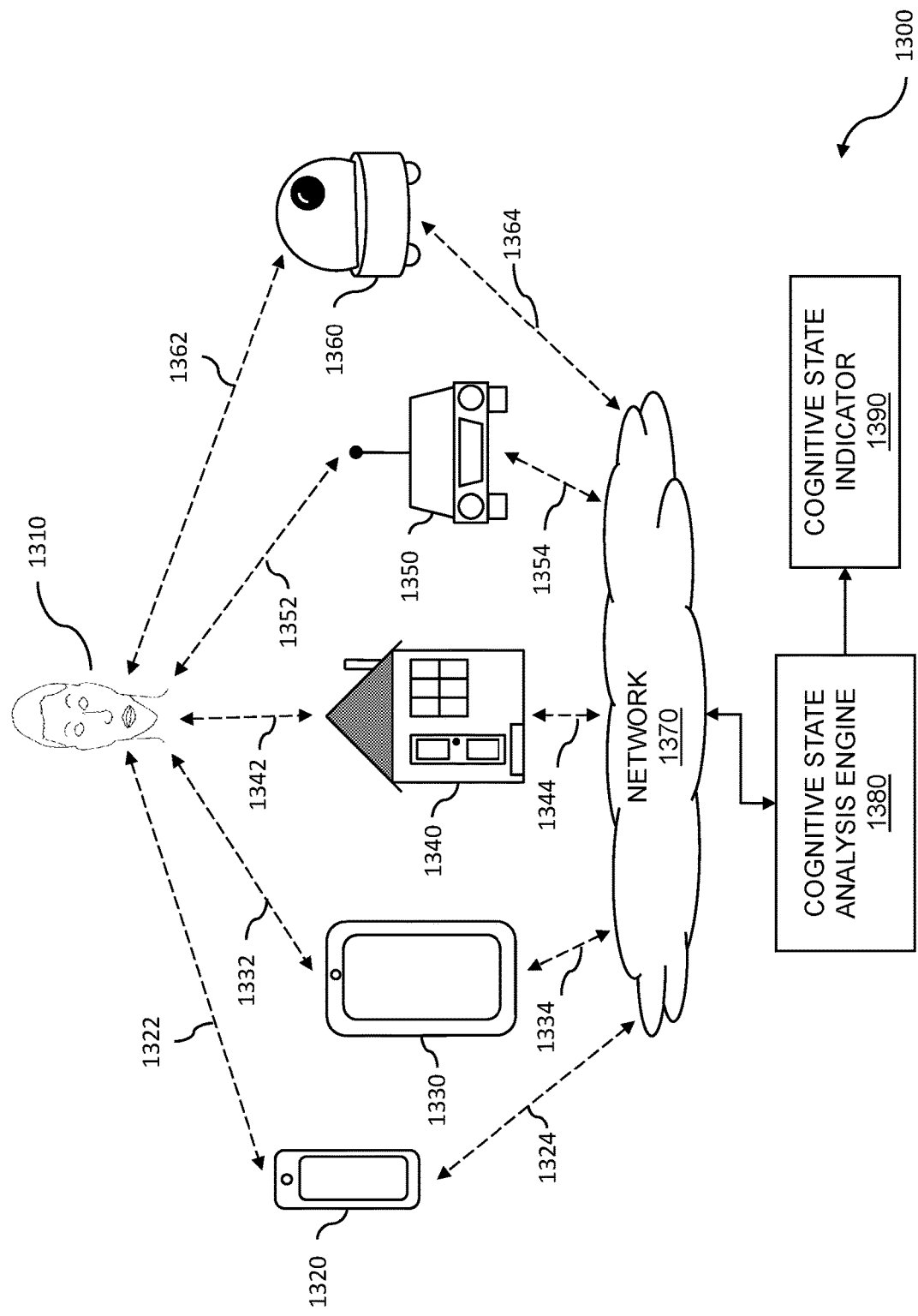
FIG. 13 shows data collection including multiple devices and locations.

FIG. 13 shows data collection including multiple devices and locations 1300. One or more of the multiple devices and locations can enable media manipulation using cognitive state metric analysis. Data on a user interacting with a media presentation is collected at a client device. The data includes facial image data of the user. The facial image data is analyzed to extract cognitive state content of the user. One or more emotional intensity metrics are generated. The metrics are based on the cognitive state content. The media presentation is manipulated, based on the emotional intensity metrics and the cognitive state content.

The multiple mobile devices, vehicles, and locations 1300 can be used separately or in combination to collect video data on a user 1310. The video data can include facial data, image data, etc. Other data such as audio data, physiological data, and so on, can be collected on the user. While one person is shown, the video data, or other data, can be collected on multiple people. A user 1310 can be observed as she or he is performing a task, experiencing an event, viewing a media presentation, and so on. The user 1310 can be shown one or more media presentations, political presentations, social media, or another form of displayed media. The one or more media presentations can be shown to a plurality of people. The media presentations can be displayed on an electronic display coupled to a client device. The data collected on the user 1310 or on a plurality of users can be in the form of one or more videos, video frames, still images, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 1310 can be analyzed and viewed for a variety of purposes including expression analysis, mental state analysis, cognitive state analysis, and so on. The electronic display can be on a smartphone 1320 as shown, a tablet computer 1330, a personal digital assistant, a television, a mobile monitor, or any other type of electronic device. In one embodiment, expression data is collected on a mobile device such as a cell phone 1320, a tablet computer 1330, a laptop computer, or a watch. Thus, the multiple sources can include at least one mobile device, such as a phone 1320 or a tablet 1330, or a wearable device such as a watch or glasses (not shown). A mobile device can include a front-facing camera and/or a rear-facing camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 1310, data can be collected in a house 1340 using a web camera or the like; in a vehicle 1350 using a web camera, client device, etc.; by a social robot 1360, and so on.

As the user 1310 is monitored, the user 1310 might move due to the nature of the task, boredom, discomfort, distractions, or for another reason. As the user moves, the camera with a view of the user's face can be changed. Thus, as an example, if the user 1310 is looking in a first direction, the line of sight 1322 from the smartphone 1320 is able to observe the user's face, but if the user is looking in a second direction, the line of sight 1332 from the tablet 1330 is able to observe the user's face. Furthermore, in other embodiments, if the user is looking in a third direction, the line of sight 1342 from a camera in the house 1340 is able to observe the user's face, and if the user is looking in a fourth direction, the line of sight 1352 from the camera in the vehicle 1350 is able to observe the user's face. If the user is looking in a fifth direction, the line of sight 1362 from the social robot 1360 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 1310 can also use a wearable device including a camera for gathering contextual information and/or collecting expression data on other users. Because the user 1310 can move her or his head, the facial data can be collected intermittently when she or he is looking in a direction of a camera. In some cases, multiple people can be included in the view from one or more cameras, and some embodiments include filtering out faces of one or more other people to determine whether the user 1310 is looking toward a camera. All or some of the expression data can be continuously or sporadically available from the various devices and other devices.

The captured video data can include cognitive content, such as facial expressions, etc., and can be transferred over a network 1370. The network can include the Internet or other computer network. The smartphone 1320 can share video using a link 1324, the tablet 1330 using a link 1334, the house 1340 using a link 1344, the vehicle 1350 using a link 1354, and the social robot 1360 using a link 1364. The links 1324, 1334, 1344, 1354, and 1364 can be wired, wireless, and hybrid links. The captured video data, including facial expressions, can be analyzed on a cognitive state analysis engine 1380, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device different from the capture device. The analysis data from the cognitive state analysis engine can be processed by a cognitive state indicator 1390. The cognitive state indicator 1390 can indicate cognitive states, mental states, moods, emotions, etc. Further embodiments include inferring a cognitive state based on emotional content within a face detected within the facial image data, wherein the cognitive state includes of one or more of drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Figure 14:
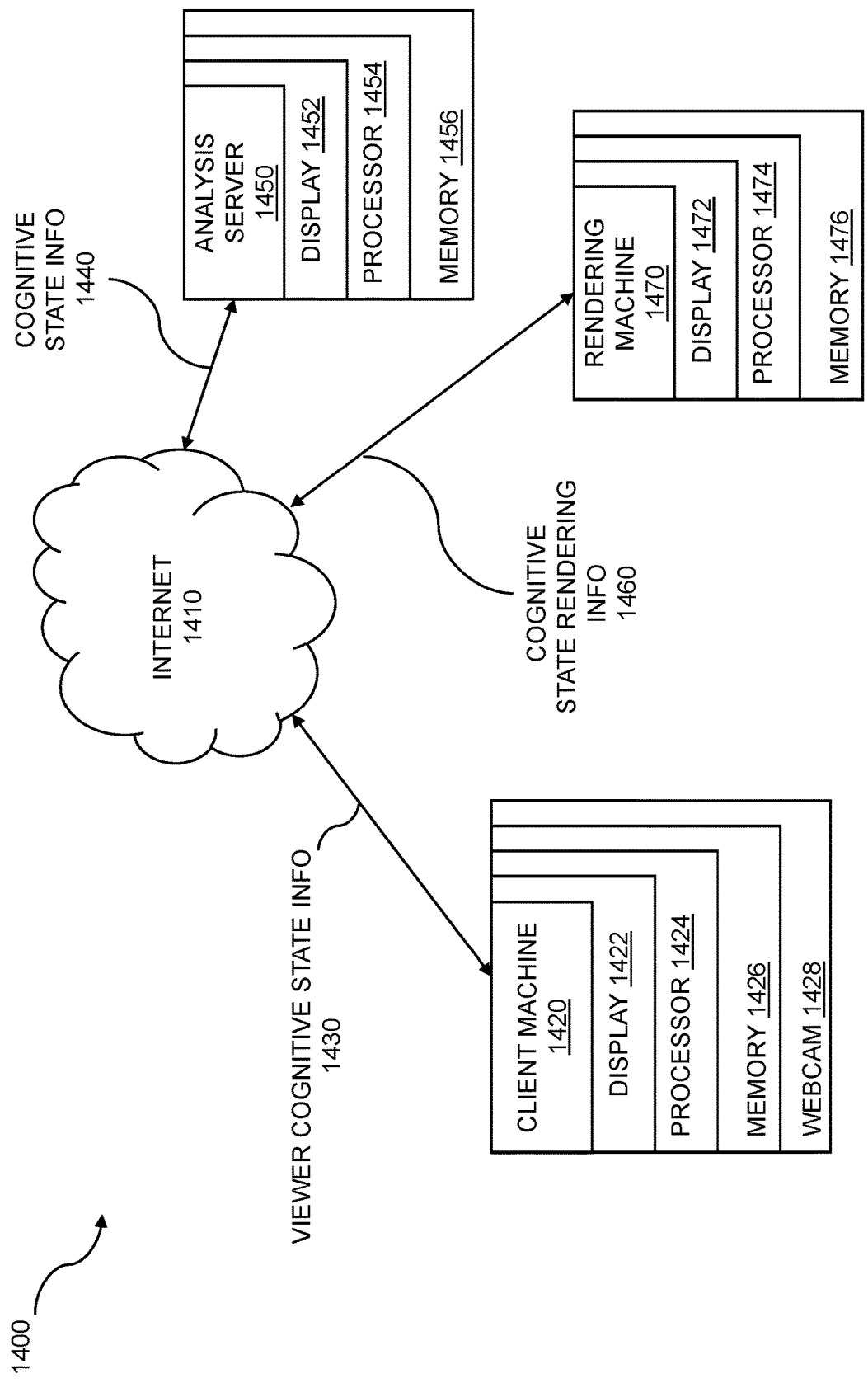
FIG. 14 is a system diagram for evaluating cognitive states.

FIG. 14 is a system diagram for evaluating cognitive states. The diagram describes an example system 1400 for media manipulation. The system 1400 includes one or more client machines 1420 linked to an analysis server 1450 via the Internet 1410 or other computer network. The client machine 1420 comprises one or more processors 1424 coupled to a memory 1426 which can store and retrieve instructions, a display 1422, and a webcam 1428. The display 1422 may be any electronic display, including but not limited to, a computer display, a laptop screen, a netbook screen, a tablet computer screen, a cell phone display, a mobile device display, a remote with a display, a television, a projector, or the like. The webcam 1428 may comprise a video camera, a still camera, a thermal imager, a CCD device, a phone camera, a three-dimensional camera, a depth camera, multiple webcams used to show different views of a person, an infrared camera, or any other type of image capture apparatus that may allow captured data to be used in an electronic system. In embodiments, the analysis server 1450 comprises one or more processors 1454 coupled to a memory 1456 which can store and retrieve instructions, and may include a display 1452.

The processors 1424 of the client machine 1420 are, in some embodiments, configured to receive cognitive state data which was collected from one or more people as they view a media presentation, analyze the cognitive state data to produce cognitive state information, and manipulate the media presentation based on the cognitive state information. In some cases, the manipulation can include media optimization and can occur in real time, based on cognitive state data captured using the webcam 1428. In other embodiments, the processors 1424 of the client machine 1420 are configured to receive cognitive state data from one or more people as they view a media presentation, analyze the cognitive state date to produce cognitive state information, and send the viewer cognitive state information 1430 through the Internet 1410 or another computer communication link to an analysis server 1450. In other embodiments, the processors 1424 of the client machine 1420 are configured to receive cognitive state data from one or more people as they view a media presentation and send the cognitive state data to the analysis server 1450.

The analysis server 1450 may receive the cognitive state data and analyze the cognitive state data to produce cognitive state information, so that the analyzing of the cognitive state data may be performed by a web service. The analysis server 1450 may use the cognitive state information received from the client machine 1420 or produced from the cognitive state data to optimize the media presentation. In some embodiments, the analysis server 1450 receives cognitive state data and/or cognitive state information from a plurality of client machines, and may aggregate the cognitive state information for use in optimizing the media presentation. In some embodiments, the rendering of cognitive state analysis and media optimization display can occur on a different computer than the client collection machine 1420 or the analysis server 1450. This computer may be a rendering machine 1470 which receives data or information 1430, cognitive state information 1440 from the analysis machine 1450, or both, and may be considered cognitive state rendering information 1460. In embodiments, the rendering machine 1470 includes one or more processors 1474 coupled to a memory 1476, and a display 1472. The rendering may include generation and display of emoticons. The system 1400 may include a computer program product embodied in a non-transitory computer readable medium for media analysis comprising: code for collecting cognitive state data from a plurality of people as they view a media presentation, code for analyzing the cognitive state data to produce cognitive state information, and code for optimizing the media presentation based on the cognitive state information. In at least one embodiment, the client machine function and the analysis server function may be accomplished by one computer.

Embodiments include a computer program product embodied in a non-transitory computer readable medium for media manipulation, the computer program product comprising code which causes one or more processors to perform operations of: collecting, at a client device, data on a user interacting with a media presentation, wherein the data comprises facial image data of the user; analyzing the facial image data to extract cognitive state content of the user; generating one or more emotional intensity metrics based on the cognitive state content; and manipulating the media presentation based on the emotional intensity metrics and the cognitive state content. Embodiments include a computer system for media analysis comprising: a memory which stores instructions; one or more processors coupled to the memory, wherein the one or more processors, when executing the instructions which are stored, are configured to: collect, at a client device, data on a user interacting with a media presentation, wherein the data comprises facial image data of the user; analyze the facial image data to extract cognitive state content of the user; generate one or more emotional intensity metrics based on the cognitive state content; and manipulate the media presentation based on the emotional intensity metrics and the cognitive state content.

This invention may have been made with government support under IIP-1152261 awarded by the NSF. The government may have certain rights to the invention.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for media manipulation comprising:
    collecting, at a client device, data on a user interacting with a media presentation that includes an advertisement, wherein the data comprises facial image data of the user;
    analyzing, using one or more processors, the facial image data to extract cognitive state content of the user;
    generating one or more emotional intensity metrics based on the cognitive state content;
    identifying a time of peak valence within the advertisement;
    optimizing the advertisement based on valence, wherein the optimizing includes deleting one or more portions of the advertisement determined to be least interesting, wherein the one or more portions determined to be least interesting are associated with absolute valence scores closest to zero; and
    manipulating the media presentation based on the emotional intensity metrics, the time of peak valence, and the cognitive state content, wherein the manipulating includes determining advertisement placement within the media presentation based on the cognitive state content of the user.

2. The method of claim 1 further comprising providing an engagement score for the media presentation, based on the emotional intensity metric.

3. The method of claim 1 further comprising calculating a facial expression metric for the user based on the facial image data.

4. The method of claim 3 wherein the cognitive state content includes a cognitive state metric for the user, generated from the facial expression metric.

5. The method of claim 1 further comprising adding music to the media presentation as part of the manipulating.

6. The method of claim 1 further comprising selecting characters for the media presentation as part of the manipulating.

7. The method of claim 1 further comprising determining duration for the media presentation as part of the manipulating.

8. The method of claim 1 further comprising determining brand reveal time within the advertisement as part of the manipulating, wherein the brand reveal time is correlated with the identified time of peak valence.

9. The method of claim 1 further comprising determining an optimal number of viewings for the media presentation as part of the manipulating.

10. The method of claim 1 wherein the manipulating includes optimizing the media presentation for a mobile platform and further comprising:
    collecting cognitive state data from a plurality of people for multiple viewings of the media presentation and optimizing the media presentation based on the multiple viewings;
    determining duration for the media presentation as part of the optimizing;
    determining brand reveal time for the media presentation;
    developing norms based on a plurality of media presentations, where the norms are used in the optimizing of the media presentation; and
    calculating an expressiveness score for the media presentation which is based on total movement for faces of the plurality of people and using the expressiveness score in the optimizing of the media presentation.

11. The method of claim 1 further comprising collecting data from a plurality of people over multiple viewings of the media presentation.

12. The method of claim 11 wherein the manipulating the media presentation is based on the multiple viewings.

13. The method of claim 11 wherein the manipulating is based on different cognitive state content being analyzed from the multiple viewings.

14. The method of claim 1 wherein the data on the user includes torso image data.

15. The method of claim 1 further comprising determining a valence quotient.

16. The method of claim 15 wherein the valence quotient ranges from −1 to +1.

17. The method of claim 1 wherein the manipulating separates a preamble from a remainder of the media presentation.

18. The method of claim 17 wherein the manipulating selects one preamble for the media presentation from multiple possible preambles.

19. The method of claim 1 wherein the manipulating the media presentation uses one or more effectiveness descriptors and an effectiveness classifier.

20. The method of claim 19 wherein probabilities for the one or more effectiveness descriptors are identified at a segment in the media presentation when a brand is revealed.

21. The method of claim 1 further comprising developing norms based on a plurality of media presentations shown to a plurality of people, wherein the norms are used in the manipulating the media presentation.

22. The method of claim 1 wherein the manipulating the media presentation includes removing portions of the media presentation when the cognitive state content indicates confusion.

23. The method of claim 1 wherein the collecting is performed within a vehicle and the analyzing, the generating, and the manipulating comprise a mobile media laboratory.

24. A computer program product embodied in a non-transitory computer readable medium for media manipulation, the computer program product comprising code which causes one or more processors to perform operations of:
collecting, at a client device, data on a user interacting with a media presentation that includes an advertisement, wherein the data comprises facial image data of the user;
analyzing, using one or more processors, the facial image data to extract cognitive state content of the user;
generating one or more emotional intensity metrics based on the cognitive state content;
identifying a time of peak valence within the advertisement;
optimizing the advertisement based on valence, wherein the optimizing includes deleting one or more portions of the advertisement determined to be least interesting, wherein the one or more portions determined to be least interesting are associated with absolute valence scores closest to zero; and
manipulating the media presentation based on the emotional intensity metrics, the time of peak valence, and the cognitive state content, wherein the manipulating includes determining advertisement placement within the media presentation based on the cognitive state content of the user.

25. A computer system for media analysis comprising:
a memory which stores instructions;
one or more processors coupled to the memory, wherein the one or more processors, when executing the instructions which are stored, are configured to:
collect, at a client device, data on a user interacting with a media presentation that includes an advertisement, wherein the data comprises facial image data of the user;
analyze the facial image data to extract cognitive state content of the user;
generate one or more emotional intensity metrics based on the cognitive state content;
identify a time of peak valence within the advertisement;
optimize the advertisement based on valence, wherein optimizing includes deleting one or more portions of the advertisement determined to be least interesting, wherein the one or more portions determined to be least interesting are associated with absolute valence scores closest to zero; and
manipulate the media presentation based on the emotional intensity metrics, the time of peak valence, and the cognitive state content, wherein manipulation includes determining advertisement placement within the media presentation based on the cognitive state content of the user.

26. The method of claim 1 further comprising optimizing the advertisement based on valence.

27. The method of claim 26 wherein the optimizing includes:
determining one or more portions of the advertisement associated with negative valence values; and
deleting the one or more portions of the advertisement determined to be associated with negative valence values.

28. The method of claim 19 wherein the one or more effectiveness descriptors each have a corresponding probability of an affect being present.

* * * * *